US007680120B2

(12) United States Patent
Aizu et al.

(10) Patent No.: US 7,680,120 B2
(45) Date of Patent: Mar. 16, 2010

(54) CONNECTED COMMUNICATION TERMINAL, CONNECTING COMMUNICATION TERMINAL, SESSION MANAGEMENT SERVER AND TRIGGER SERVER

(75) Inventors: Kazuhiro Aizu, Beijing (CN); Takahiro Tsujimoto, Moriguchi (JP); Yasuyuki Shintani, Nishinomiya (JP); Shinichi Tsuchida, Ibaraki (JP)

(73) Assignee: Panasonic Corporation, Osaka (JP)

( * ) Notice: Subject to any disclaimer, the term of this patent is extended or adjusted under 35 U.S.C. 154(b) by 906 days.

(21) Appl. No.: 10/581,059

(22) PCT Filed: Feb. 18, 2005

(86) PCT No.: PCT/JP2005/003072

§ 371 (c)(1),
(2), (4) Date: May 30, 2006

(87) PCT Pub. No.: WO2005/081493

PCT Pub. Date: Sep. 1, 2005

(65) Prior Publication Data

US 2007/0104180 A1 May 10, 2007

(30) Foreign Application Priority Data

Feb. 19, 2004 (JP) ............................. 2004-042416

(51) Int. Cl.
*H04L 12/56* (2006.01)
(52) U.S. Cl. ................. 370/395.2; 370/352; 370/395.5; 709/222; 709/229
(58) Field of Classification Search ......... 709/227–229, 709/223–226; 370/352
See application file for complete search history.

(56) References Cited

U.S. PATENT DOCUMENTS 6,145,084 A * 11/2000 Zuili et al. ..................... 726/3

(Continued)

FOREIGN PATENT DOCUMENTS

JP 2003-158553 5/2003

OTHER PUBLICATIONS

U. S. Chathapuram: "Security in Peer-to-Peer Networks", Internet, Aug. 8, 2001, XP002251813, pp. 5-7.

(Continued)

*Primary Examiner*—Huy D Vu
*Assistant Examiner*—Zewdu Beyen
(74) *Attorney, Agent, or Firm*—Wenderoth, Lind & Ponack, L.L.P.

(57) ABSTRACT

The communication system according to the present invention is made up of: a connected communication terminal (1) to which communication is requested; a connecting communication terminal (3) that requests a communication with the connected communication terminal (1); a session management server (4) that manages sessions between the communication terminals; a trigger server (5) that transmits, to the connected communication server (1), the request made by the session management server (4); and routers (6 and 7) that relay between the connecting communication terminal (3) and the connected communication terminal (1), and a network (2). In the system, the connected communication terminal (1) holds a permission list (L) that is a list of communication terminals to which connection is permitted, and the session management server (4) judges, with reference to the permission list (L), whether or not the communication between the connected communication terminal (1) and the connecting communication terminal (3) is permitted.

41 Claims, 16 Drawing Sheets

U.S. PATENT DOCUMENTS

| | | | |
|---|---|---|---|
| 6,199,164 B1* | 3/2001 | Nishimoto et al. | 726/2 |
| 6,532,241 B1* | 3/2003 | Ferguson et al. | 370/469 |
| 6,798,786 B1* | 9/2004 | Lo et al. | 370/468 |
| 6,819,663 B2* | 11/2004 | Komuro | 370/352 |
| 7,017,050 B2* | 3/2006 | Dalton et al. | 726/5 |
| 7,076,554 B1* | 7/2006 | Kobayashi | 709/227 |
| 7,103,663 B2* | 9/2006 | Inoue et al. | 709/225 |
| 7,170,857 B2* | 1/2007 | Stephens et al. | 370/230 |
| 7,233,997 B1* | 6/2007 | Leveridge et al. | 709/229 |
| 7,349,369 B2* | 3/2008 | Tsirtsis et al. | 370/328 |
| 7,353,282 B2* | 4/2008 | Nichols et al. | 709/229 |
| 7,356,601 B1* | 4/2008 | Clymer et al. | 709/229 |
| 7,437,732 B1* | 10/2008 | Boydstun et al. | 719/313 |
| 7,437,752 B2* | 10/2008 | Heard et al. | 726/1 |
| 7,440,456 B2* | 10/2008 | Furukawa et al. | 370/392 |
| 7,454,195 B2* | 11/2008 | Lewis et al. | 455/412.1 |
| 7,509,379 B2* | 3/2009 | Degraeve | 709/206 |
| 2002/0124053 A1* | 9/2002 | Adams et al. | 709/216 |
| 2002/0136206 A1* | 9/2002 | Gallant et al. | 370/352 |
| 2002/0150110 A1 | 10/2002 | Inbar et al. | |
| 2003/0028639 A1* | 2/2003 | Yamamoto et al. | 709/225 |
| 2003/0061380 A1* | 3/2003 | Saito et al. | 709/238 |
| 2003/0095546 A1 | 5/2003 | Sakano et al. | |
| 2003/0115327 A1* | 6/2003 | Kokado et al. | 709/225 |
| 2003/0140121 A1* | 7/2003 | Adams | 709/219 |
| 2004/0170267 A1* | 9/2004 | Seligmann | 379/211.01 |
| 2004/0255032 A1* | 12/2004 | Danieli | 709/229 |
| 2005/0108520 A1* | 5/2005 | Yamamoto et al. | 713/155 |
| 2005/0210148 A1* | 9/2005 | Kato et al. | 709/244 |
| 2005/0216595 A1* | 9/2005 | Miyata et al. | 709/227 |
| 2006/0009213 A1* | 1/2006 | Sturniolo et al. | 455/426.1 |
| 2006/0077957 A1* | 4/2006 | Reddy et al. | 370/352 |
| 2007/0038759 A1* | 2/2007 | Hanson et al. | 709/227 |
| 2007/0047523 A1* | 3/2007 | Jiang | 370/352 |
| 2007/0286389 A1* | 12/2007 | Hyerle et al. | 379/207.01 |
| 2009/0077602 A1* | 3/2009 | O'Neil | 725/109 |

OTHER PUBLICATIONS

J. Aslund: "Authentication in peer-to-peer systems", Internet, May 16, 2002, XP002296476, pp. 21-24, pp. 36 and 37, pp. 81-86.

G. A. Bolcer et al., "Peer-to-Peer Architectures and the Magi™ Open-Source Infrastructure", Internet, 'Online!, Dec. 6, 2000, XP002322969, retrieved from the internet: URL:http://www.endeavors.com/pdfs/ETI%20P2P%20white%20paper.pdf>, retrieved on Mar. 31, 2005.

* cited by examiner

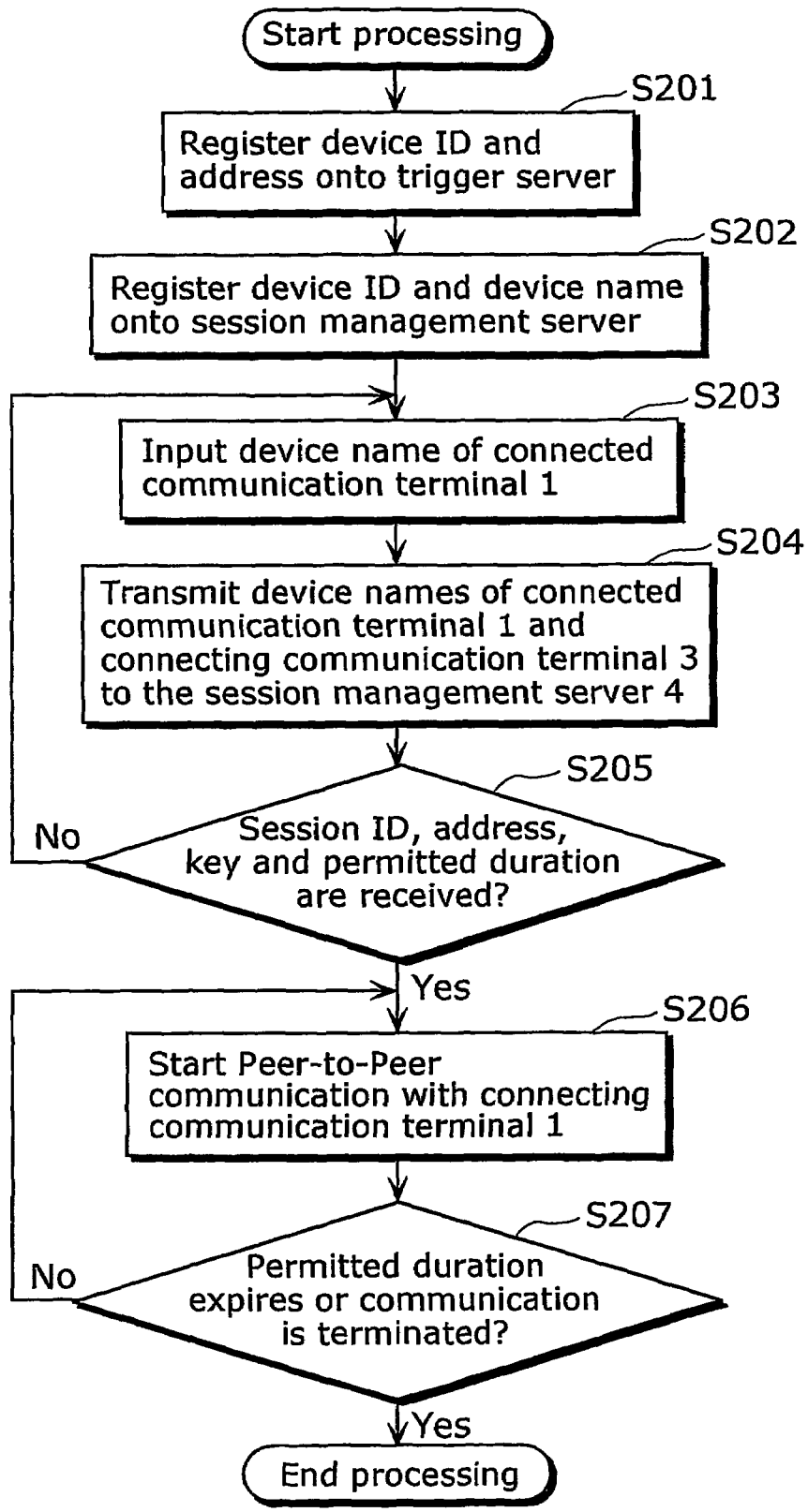

FIG. 3

300 — Self-device name
301 — Partner-device name

| TERM3 | TERM1 |

- 401 Session ID
- 402 Address (of connected communication terminal)
- 403 Key
- 404 Permitted duration

| Session ID | Address | Key | Permitted duration |
|---|---|---|---|
| S0001 | 10.20.30.1 | 01de 1a58 596f 58db<br>5a0e 9543 4812 12ea<br>3a8c 77ac 85c2 1587<br>1d9c fc91 de85 0954 | 60 |

- 411 Session ID
- 412 Address (of connecting communication terminal)
- 413 Key
- 414 Permitted duration

| Session ID | Address | Key | Permitted duration |
|---|---|---|---|
| S0001 | 40.50.60.1 | 01de 1a58 596f 58db<br>5a0e 9543 4812 12ea<br>3a8c 77ac 85c2 1587<br>1d9c fc91 de85 0954 | 60 |

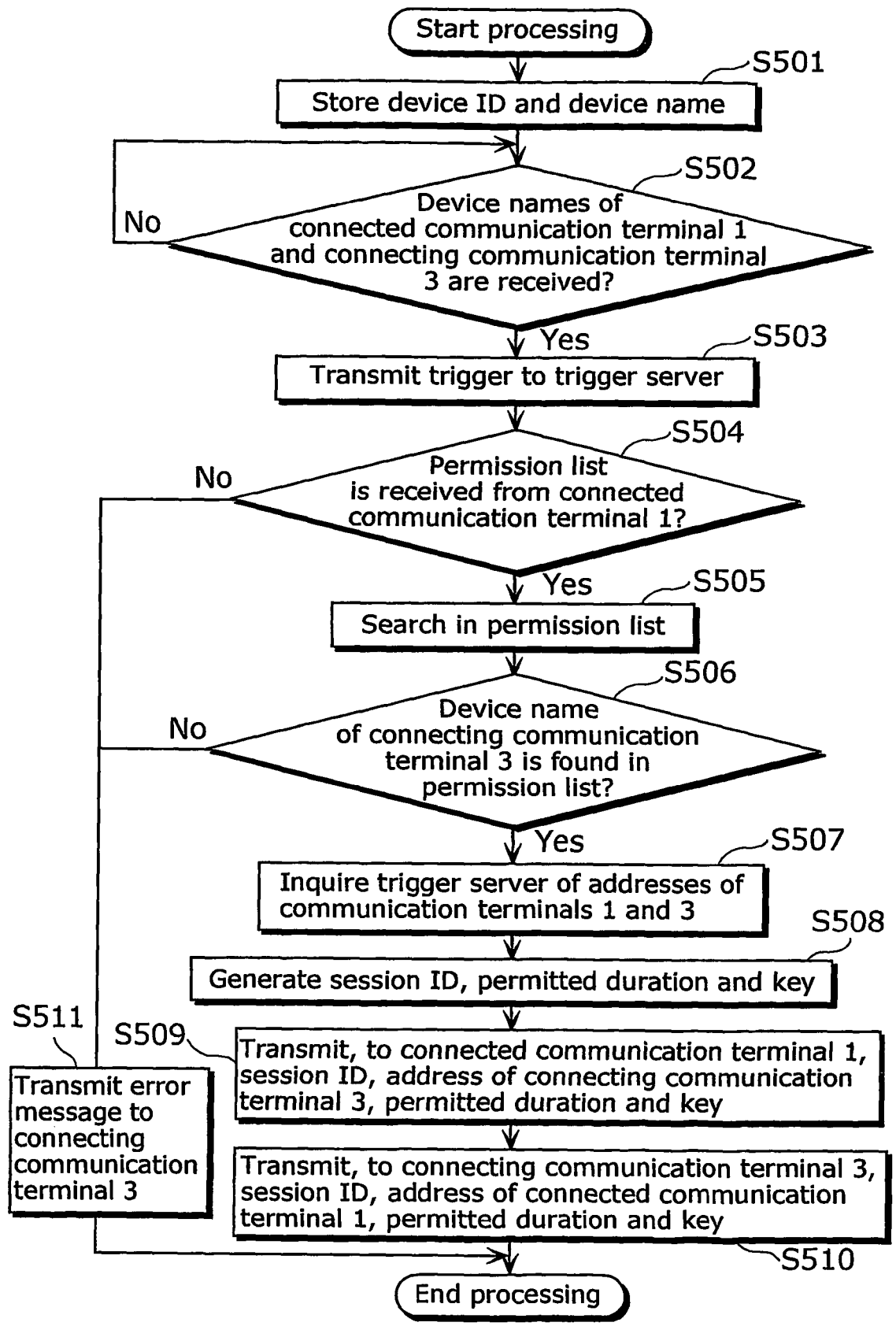

Trigger server 5    Router 6 or 7    Communication terminal 1 or 3

Polling intervals

901

| Header section | | | | Data section | | |
|---|---|---|---|---|---|---|
| Destination address | Destination port number | Source address | Source port number | Device ID | Port number | ---- |

902

Router 6 or 7

| Local network side | | Global network side | |
|---|---|---|---|
| Local address | Port number | Global address | Port number |
| 192.168.0.2 | 5000 | 200.123.4.5 | 6000 |
| 192.168.0.3 | 5000 | 200.123.4.5 | 6080 |
| ⋮ | ⋮ | ⋮ | ⋮ |

> US 7,680,120 B2

CONNECTED COMMUNICATION TERMINAL, CONNECTING COMMUNICATION TERMINAL, SESSION MANAGEMENT SERVER AND TRIGGER SERVER

TECHNICAL FIELD

The present invention relates to communication terminals utilizing a network and a server apparatus for managing sessions between the communication terminals, and in particular, to communication terminals and a server apparatus for Peer-to-Peer communication for directly sending and receiving data.

BACKGROUND ART

Recently, use of an access network, which is a large-capacity communication broadband such as Asymmetric Digital Subscriber Line (ADSL) and optical fiber, and is always connectable, has rapidly spread among home users. In the conventional method of the Peer-to-Peer communication, the communication terminals are connected via a network to perform direct communication. One of the examples is that, in order to resolve an address of the terminal apparatus on the other end of the communication, a server is utilized or another communication terminal is inquired of the address through relaying (e.g., Japanese Laid-Open Publication No. 2003-158553).

FIG. 17 shows a communication system using the conventional IP telephone apparatuses described in the above-mentioned reference. For example, in the case when an IP telephone apparatus 10A calls an IP telephone apparatus 10C, the IP telephone apparatus 10A obtains an address of the IP telephone apparatus 10C by inquiring IP telephone apparatuses 10B, 10C and 10D based on the phone numbers. Each of the IP telephone apparatuses is equipped with a Peer-to-Peer communication apparatus for sending and receiving information based on the Peer-to-Peer method via an IP network, a phone number search apparatus for verifying the correspondence between the phone number received by the Peer-to-Peer communication apparatus and the phone number of the IP telephone apparatus. The Peer-to-Peer communication apparatus sends back the IP address of the IP telephone apparatus only in the case when the phone numbers match as a result of verification.

The structure of the IP telephone apparatus shown in the patent literature mentioned above, however, faces a problem that the IP phone 10A can obtain the address of the IP telephone apparatus 10C without a permission of the IP telephone apparatus 10C. Such problem is notable especially in the case when the user of the IP telephone apparatus 10A is an ill-intentioned person. In this case, information related to an attack such as Denial of Service attack (DoS attack) is given to the IP telephone apparatus 10C.

Another problem is that a manager such as an agent who manages the Peer-to-Peer communication cannot know how long the IP telephone apparatus 10A communicates with the IP telephone apparatus 10C, and thus cannot manage the communication.

It is yet another problem caused in using the conventional IP telephone apparatuses that, in some cases, it is impossible to achieve real-time connection since it requires time for the conventional IP telephone apparatus to obtain information such as an IP address of a connected communication terminal when the connecting communication terminal communicates with the connected communication terminal using phone numbers.

DISCLOSURE OF INVENTION

The present invention is to solve the problems as described above. A first object of the present invention is to provide communication terminals among which the sessions based on the Peer-to-Peer communication is established real-time, and a connected communication terminal can properly make judgment on possibility for the connection based on the request made by the connecting communication terminal.

A second object of the present invention is to provide a session management server and a trigger server that can manage the Peer-to-Peer communication between the connecting communication terminal and the connected communication terminal.

In order to achieve the above objects, the connected communication terminal apparatus according to the present invention is a connected communication terminal that communicates with a connecting communication terminal that requests direct communication via a network, said connected communication terminal including: a registration unit operable to register (i) a pair of a device ID and a device name onto a session management server that manages sessions between the communication terminals, and (ii) a pair of the device ID and an address of the connected communication terminal onto a trigger server that notifies the connected communication terminal of a request made by the session management server, the device ID identifying the connected communication terminal, and the device name indicating a name of the connected communication terminal; a holding unit operable to hold a permission list that is a list of device names of communication terminals to which direct communication is permitted; a polling unit operable to perform, upon receiving a request for a communication with the session management server from the trigger server, polling on the trigger server so as to receive the request from the trigger server; an address resolution unit operable to receive, from the session management server, at least an address of the connecting communication terminal and a session ID that is unique to the communication with the connecting communication terminal; and a Peer-to-Peer communication unit operable to perform direct communication with the connecting communication terminal in the case when the address of the connecting communication terminal and the session ID are received.

With this structure, it is possible to assure the security in the communication between the communication terminals since the connected communication terminal does not perform Peer-to-Peer communication with the communication terminals which are not in the permission list.

The connecting communication terminal apparatus according to the present invention is a connecting communication terminal that performs direct communication with a connected communication terminal via a network, said connecting communication terminal including: a registration unit operable to register (i) a pair of a device ID and a device name onto a session management server that manages sessions between the communication terminals, and (ii) a pair of the device ID and an address of the connecting communication terminal onto a trigger server that notifies the connected communication terminal of a request made by the session management server, the device ID identifying the connecting communication terminal, and the device name indicating a name of the connecting communication terminal; a receiving unit operable to receive a request for a connection to the connected communication terminal; a transmission unit operable to transmit device names of the connecting communication terminal and the connected communication terminal to the session management server, in the case when the request is received; an address resolution unit operable to obtain an address of the connected communication terminal by receiving, from the session management server, at least the address of the connected communication terminal and a session ID that is unique to the communication with the connected communication terminal, after the transmission performed by said transmission unit; and a Peer-to-Peer communication unit operable to perform direct communication with the connected communication terminal in the case when the address of the connected communication terminal is received.

With this structure, the connecting communication terminal only has to input or transmit the device name of the connected communication terminal to which connection is requested. The session management server, on the other hand, judges real-time the possibility for communication, and notifies the connecting communication terminal of the address of the connected communication terminal to which connection is requested. It is therefore possible to improve authenticity of the communication between the communication terminals.

The session management server according to the present invention is a session management server that manages direct communication between a connecting communication terminal and a connected communication terminal, said session management server including: a storage unit operable to receive a pair of device ID and device name that is transmitted from the respective communication terminals, the device ID identifying each of the communication terminals, and the device name indicating a name of each communication terminal; a trigger transmission unit operable, upon receiving a connection request in which device names of the connecting communication terminal and the connected communication terminal are described, (i) to extract, based on the device name, a device ID of the connected communication terminal from said storage unit, and (ii) to transmit, to a trigger server, a trigger for requesting the connected communication terminal identified by the device ID to transmit a permission list, the trigger server notifying of the request made to the connected communication terminal, and the permission list being a list of device names of communication terminals to which communication is permitted; a name search unit operable to search for the device name of the connecting communication terminal in the permission list after receiving the permission list; an address inquiry unit operable to transmit, to the trigger server, an address inquiry for inquiring about addresses of the connecting communication terminal and the connected communication terminal based on the device IDs of the communication terminals, in the case when the device name of the connecting communication terminal is found in the permission list; a session generation unit operable to generate a session ID that is unique to the communication between the connecting communication terminal and the connected communication terminal; and a transmission unit operable to transmit (i) at least the session ID and the address of the connected communication terminal to the connecting communication terminal, and (ii) at least the session ID and the address of the connecting communication terminal to the connected communication terminal, in the case when said address inquiry unit receives, from the trigger server, the addresses of the communication terminals as a response to the address inquiry.

With this structure, the name search unit in the session management server obtains a permission list from the connected communication terminal, judges whether or not the connecting communication terminal is in the list, and permits the communication terminals to perform Peer-to-Peer communication in the case when the connecting communication terminal is in the list. The session generation unit, on the other hand, generates a session ID so that the Peer-to-Peer communication between the communication terminals can be managed.

The trigger server according to the present invention is a trigger server that manages addresses of a connecting communication terminal and a connected communication terminal, and that notifies the connected communication terminal of a request, the trigger server including: an address storage unit operable to receive and store a pair of device ID and address that is transmitted from the respective communication terminals, the device ID identifying each of the communication terminals; a receiving unit operable to receive, from a session management server, a trigger for requesting a transmission of a permission list, the session management server managing sessions between the connecting communication terminal and the connected communication terminal, and the permission list being a list of device names of communication terminals to which communication is permitted; a trigger processing unit operable to transmit, to the connected communication terminal, the request of transmitting the permission list to the session management server, in the case when the trigger is received; and a polling receiving unit operable to receive polling performed by the connected communication terminal, so as to transmit the request.

With this structure, the trigger server can always keep the addresses of the connecting communication terminal and the connected communication terminal. When receiving, from the session management server, a request for the communication with the connected communication terminal, the trigger server can obtain real-time the address of the connected communication terminal and transmit the communication request to the connected communication terminal.

Note that in order to achieve the above objects, the present invention can be realized as the communication method that includes, as steps, the characteristic units of the communication terminal, and also as a program that includes all the steps. The program can be distributed via a storage medium such as a CD-ROM or a communication network as well as stored in a ROM equipped with the communication terminal.

FURTHER INFORMATION ABOUT TECHNICAL BACKGROUND TO THIS APPLICATION

The disclosure of Japanese Patent Application No. 2004-042416 filed on Feb. 19, 2004, including specification, drawings and claims, is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 2 is a flowchart showing a procedure in the operation performed by the connecting communication terminal according to the first embodiment;

FIG. 3 is a reference diagram showing an example of the structure of data for requesting a connection;

FIG. 4A shows an example of the data structure of the address notification 400 to be transmitted from a session management server to the connecting communication terminal 3;

FIG. 4B shows an example of the data structure of the address notification 410 to be transmitted from the session management server to the connected communication terminal;

FIG. 5 is a flowchart showing a procedure in the operation performed by the session management server according to the first embodiment;

BEST MODE FOR CARRYING OUT THE INVENTION

The following describes, with reference to the diagrams, the connecting communication terminal, the connected communication terminal, the session management server and the trigger server according to the present invention.

First Embodiment

Figure 1:
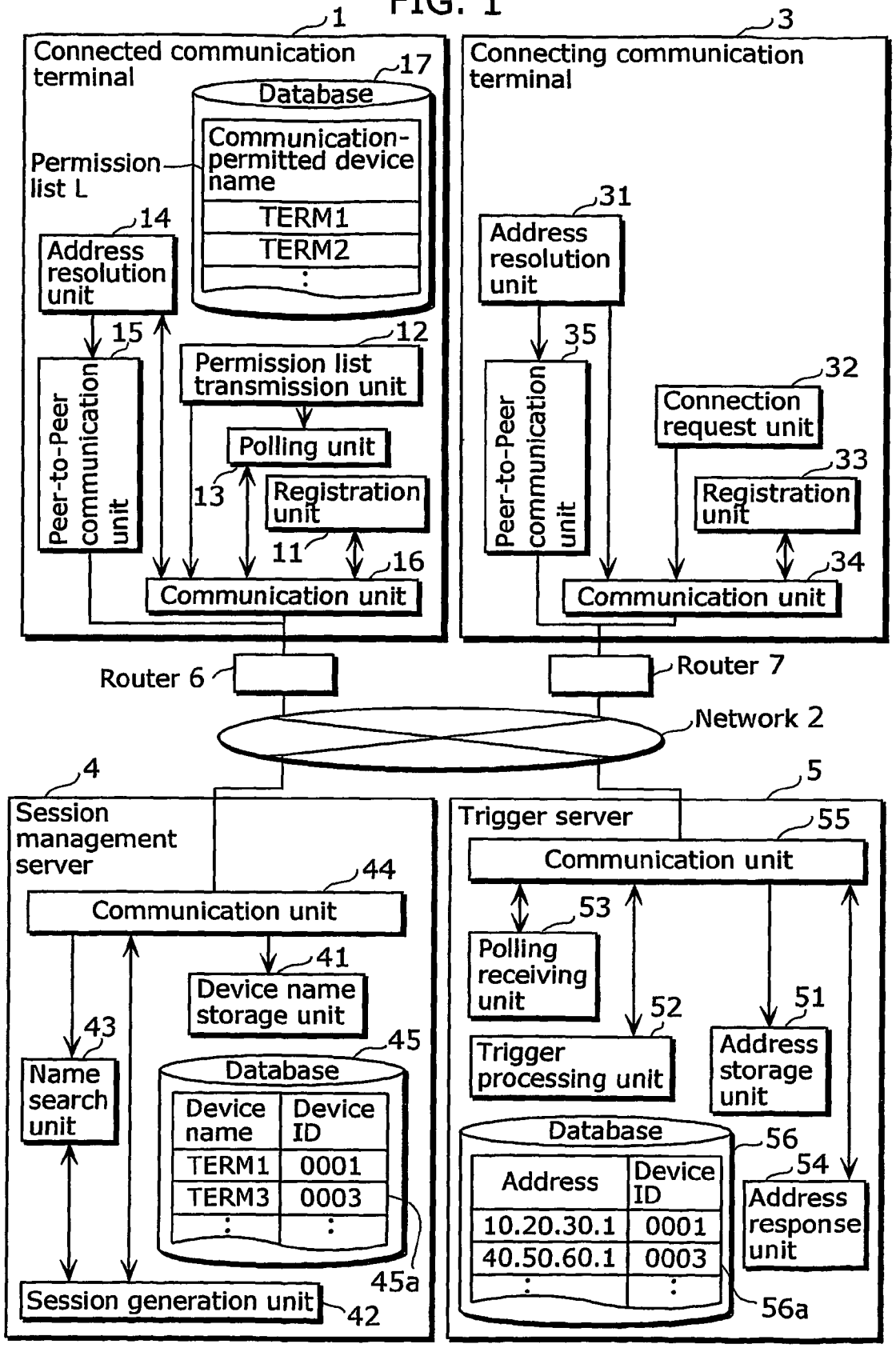
FIG. 1 shows an overall structure of the communication system according to a first embodiment of the present invention.

FIG. 1 shows an overall structure of the communication system according to the first embodiment. The communication system includes: a connected communication terminal 1; a network 2; a connecting communication terminal 3; a session management server 4 that manages the sessions between the communication terminals; a trigger server 5 that transmits, to the respective communication terminals 1 and 3, a request from the session management server 4; and routers 6 and 7 which are relay apparatuses for relaying between the connecting communication terminal 3 and the connected communication terminal 1, and the network 2.

The connected communication terminal 1 is a terminal apparatus to which connection is requested by the connecting communication terminal 3, and which is placed at home and is connected to the router 6. Such connected communication terminal 1 includes a registration unit 11, a permission list transmission unit 12, a polling unit 13, an address resolution unit 14, a Peer-to-Peer communication unit 15 and a communication unit 16.

The registration unit 11 registers, onto the trigger server 5, a pair that is made of a device ID that is unique to each communication terminal and an address (e.g., IP address), and registers, onto the session management server 4, a pair made of the device ID and a device name that is unique to each communication terminal.

The permission list transmission unit 12 transmits, to the session management server 4, a list of the device names of the communication terminals with which the connected communication terminal 1 can perform Peer-to-Peer communication.

The polling unit 13 receives, from the trigger server 5, a request for communication with the session management server 4.

In the case when the communication with another communication terminal (e.g., the connecting communication terminal 3) is permitted, the address resolution unit 14 obtains the address of the connecting communication terminal 3 and information such as a session ID that is unique to each communication.

The Peer-to-Peer communication unit 15 performs data communication with the connecting communication terminal 3 using the Peer-to-Peer communication that is direct communication. The communication unit 16 performs communication with the session management server 4 and the trigger server 5.

A permission list L is kept in the database 17. The permission list L is a list of communication-permitted devices (e.g., "TERM 1" and "TERM3" in the diagram) for which Peer-to-Peer communication is permitted by the connected communication terminal 1. Note that the permission list L can be previously held by the connected communication terminal 1 or can be modified by the operation using keyboard or the operation on the screen.

Note that the connected communication terminal 1, as will be mentioned later, regularly transmits packet data for notifying an address to the trigger server 5 so that the router 6 can hold a correlation between local address and global address. Owing to the management of global address performed by the trigger server 5, a real-time connection can be achieved by always identifying the connected communication terminal 1 based on the device ID and the like.

The connecting communication terminal 3 is a terminal apparatus that requests, to the connected communication terminal 1, a connection for communication using IP phones or the like, and is connected to the external network 2 via the router 7. Such connecting communication terminal 3 includes an address resolution unit 31, a connection request unit 32, a registration unit 33, a communication unit 34, and a Peer-to-Peer communication unit 35. Note that the address resolution unit 31, the registration unit 33, the communication unit 34, the Peer-to-Peer communication unit 35 are the processing units as same as those included in the connected communication terminal 1, therefore, the detailed description is not repeated here.

The connection request unit 32 inputs the device name of another communication terminal (e.g., the connected communication terminal 1), and transmits, to the session management sewer 4, the device names of the connected communication terminal 1 as well as the connecting communication terminal 3. After that, in the case when the communication is permitted, the connection request unit 32 obtains, from the session management sewer 4, the address of the connected communication terminal 1 and the information such as a session ID that is unique to each communication. Note that it is conceivable to transmit phone numbers instead of device names in the case of telecommunication.

Note that, in the first embodiment, the name of the connected communication terminal 1 is "TERM1", the device ID is "0001", the address is "10.20.30.1" while the name of the connecting communication terminal 3 is "TERM3", the device ID is "0003", the address is "40.50.60.1".

The session management server 4 is a server apparatus for managing sessions such as telecommunication using the Peer-to-Peer communication between the connecting communication terminal 3 and the connected communication terminal 1. Such session management server 4 includes a device name storage unit 41, a session generation unit 42, a name search unit 43, a communication unit 44 and a database 45.

The device name storage unit 41 is a processing unit for storing, into the database 45, a pair of device ID and device name of the respective connected communication terminal 1 and the connecting communication terminal 3.

The session generation unit 42 detects a device ID based on the device name of the connected communication terminal 1 received from the connecting communication terminal 3, and transmits, to the trigger server 5, a trigger for requesting the connected communication terminal 1 identified by the detected device ID to transmit the permission list L. The session generation unit 42 also generates a session ID in the case when the communication between the two communication terminals is permitted by the name search unit 43.

The name search unit 43 receives the permission list L from the connected communication terminal 1, and judges whether or not the device name of the connecting communication terminal 3 is written in the permission list L. In the case when the device name is found after the search, the name search unit 43 transmits, to the trigger server 5, an address inquiry for inquiring about the addresses of the connected communication terminal 1 and the connecting communication terminal 3.

The name search unit 43 receives the address of the connecting communication terminal 3 as a response from the trigger server 5, transmits at least the session ID and the address of the connected communication terminal 1 to the connecting communication terminal 3, and at least the session ID and the address of the connecting communication terminal 3, to the connected communication terminal 1.

The communication unit 44 performs a sequence of communication with the connected communication terminal 1, the connecting communication terminal 3 and the trigger server 5.

The database 45 holds a table 45a in which the correlation between the device names stored in the device name storage unit 41 and device IDs is stored. As shown in the diagram, for example, the device name of the connected communication terminal 1 "TERM1" and the device name of the connecting communication terminal 3 "TERM3" are listed as device names whereas the device ID "0001" of the connected communication terminal 1 and the device ID "0003" of the connecting communication terminal 3 are listed as device IDs.

The trigger server 5 is a server for transmitting, to the connected communication terminal 1, a trigger for requesting a connection for communication with the session management server 4. Such trigger server 5 includes an address storage unit 51, a trigger processing unit 52, a polling receiving unit 53, an address response unit 54, a communication unit 55 and a database 56.

The address storage unit 51 stores, into the database 56, a pair of device ID and address of each communication terminal (connected communication terminal 1 and connecting communication terminal 3 in the case of FIG. 1).

The trigger processing unit 52 receives a trigger from the session management server 4, and transmits the request for the communication with the session management server 4 to either the connected communication terminal 1 or the connecting communication terminal 3.

The polling receiving unit 53 receives a polling from either the connected communication terminal 1 or the connecting communication terminal 3 in order to transmit the request.

The address response unit 54 receives an address inquiry from the session management server 4, extracts the address that is inquired, and transmits, to the session management server 4, a response to the address inquiry.

The communication unit 55 performs a sequence of communication between the connected communication terminal 1, the connecting communication terminal 3 and the session management server 4.

In the database 56, an address table 56a is stored in the address storage unit 51. For example, the address "10.20.30.1" of the connected communication terminal 1 and the address "40.50.60.1" of the connecting communication terminal 3 are listed as addresses.

FIG. 2 is a flowchart showing a procedure in the operation performed by the connecting communication terminal 3 according to the first embodiment.

Firstly, the registration unit 11 in the connecting communication terminal 3 transmits, to the trigger server 5, a pair of the device ID and the address of the connecting communication terminal 3 (S201), and transmits, to the session management server 4, a pair of the device ID and the device name of the connecting communication terminal 3 (S202). With such processing, the correlation between the device ID and the device name is kept in the session management server 4 while the correlation between the device ID and the address is kept in the trigger server 5.

Then, the address resolution unit 31 inputs, with the use of a keyboard or on the screen, the device name "TERM1" of the connected communication terminal 1 to which a connection is requested for communication (S203). The address resolution unit 31 then creates, as a connection request, data in which the device name "TERM3" of its own as well as the device name "TERM1" of the apparatus on the other side of the communication are described. The connection request unit 32 transmits the connection request to the session management server 4 via the communication unit 34 (S204).

FIG. 3 is a reference diagram showing an example of the structure of the data for requesting a connection. The device name "TERM3" of the connecting communication terminal 3 that transmits a connection request is described as a self-device name 300 while the device name "TERM1" of the connected communication terminal 1 is described as a partner-device name 301.

In the case when the connection is permitted after the session management server 4 searches in the permission list L based on the method to be mentioned later, the address resolution unit 14 receives, from the session management server 4, the information such as session ID and IP address of the connected communication terminal 1, key, and permitted duration, as an address notification (S205).

FIG. 4A shows an example of the data structure of the address notification 400 to be transmitted from the session management server 4 to the connecting communication terminal 3, while FIG. 4B shows an example of the data structure of the address notification 410 to be transmitted from the session management server 4 to the connected communication terminal 1.

As shown in FIG. 4A, the session ID 401 includes an ID that is unique to the communication with the connected communication terminal 1 and that is generated by the session management server 4. An address 402 includes the address of the connected communication terminal 1. A key 403 is used for encryption and decryption for communicating with the connected communication terminal 1. The longest communication duration for the communication with the connected communication terminal 1 is described in a permitted duration 404. In the example shown in FIG. 4A, the longest communication duration is sixty minutes.

After the address resolution unit 31 receives the address notification 400 from the session management server 4, the Peer-to-Peer communication unit 35 starts communicating with the connected communication terminal 1 corresponding to the address 402 (S206). Note that encryption and decryption are performed on the data to be communicated, using the key 403. For example, 3DES and AES are taken as examples of an algorithm for encryption and decryption.

Then, the Peer-to-Peer communication unit 35 terminates the communication with the connected communication terminal 1 in the case when all the data communication with the connected communication terminal 1 is completed, or sixty minutes indicated by the permitted duration 404 has elapsed (S207).

FIG. 5 is a flowchart showing a procedure in the operation performed by the session management server 4 according to the first embodiment.

Firstly, the device name storage unit 41 in the session management server 4 receives a pair of device name and device ID from the respective connected and connecting communication terminals 1 and 3, and stores them into the database 45 (S501).

Then, receiving the connection request shown in FIG. 3 from the connecting communication terminal 3 (Yes in S502), the session generation unit 42 transmits, to the trigger server 5, a trigger for requesting the connected communication terminal 1 to transmit the permission list L (S503).

Having received the permission list L from the connected communication terminal 1 (Yes in S504), the name search unit 43 searches, in the permission list L, for the device name "TERM3" of the connecting communication terminal 3 (S505).

In the case when the device name of the connecting communication terminal 3 is found in the permission list L (Yes in S506), the name search unit 43 transmits, to the trigger server 5, an address inquiry for inquiring about the addresses of the connected communication terminal 1 and the connecting communication terminal 3 (S507).

After receiving, from the trigger server, the addresses of the connected communication terminal 1 and the connecting communication terminal 3 as a response to the address inquiry, the session generation unit 42 generates a session ID, a permitted duration and a key for the communication between the connected communication terminal 1 and the connecting communication terminal 3 (S508). Note that the values that are already set between the two communication terminals may be used for the information on permitted duration and key.

Then, the communication unit 44 transmits, as the address notification 410, the session ID, the address of the connecting communication terminal 3, the permitted duration, and the key, to the connected communication terminal 1 (S509). The communication unit 44 also transmits, as the address notification 400, the session ID, the address of the connected communication terminal 1, the permitted duration and the key, to the connecting communication terminal 3 (S510). Here, an example of the address notification 410 to be transmitted from the session management server 4 to the connected communication terminal 1 is shown in FIG. 4B. As shown in FIG. 4B, the same values are described for the session ID 411 of the address notification 410, the key 413, the permitted duration 414 as the session ID 401 indicated in the address notification 400, the key 403, and the permitted duration 404. Note that an address such as an IP address of the connecting communication terminal 3 is described in the address 412.

In the case when the session management server 4 fails to receive the permission list L from the connected communication terminal 1 (No in S504), or in the case when the device name of the connecting communication terminal 3 is not found in the permission list L (No in S506), an error message is transmitted to the connecting communication terminal 3 (S511).

Figure 6:
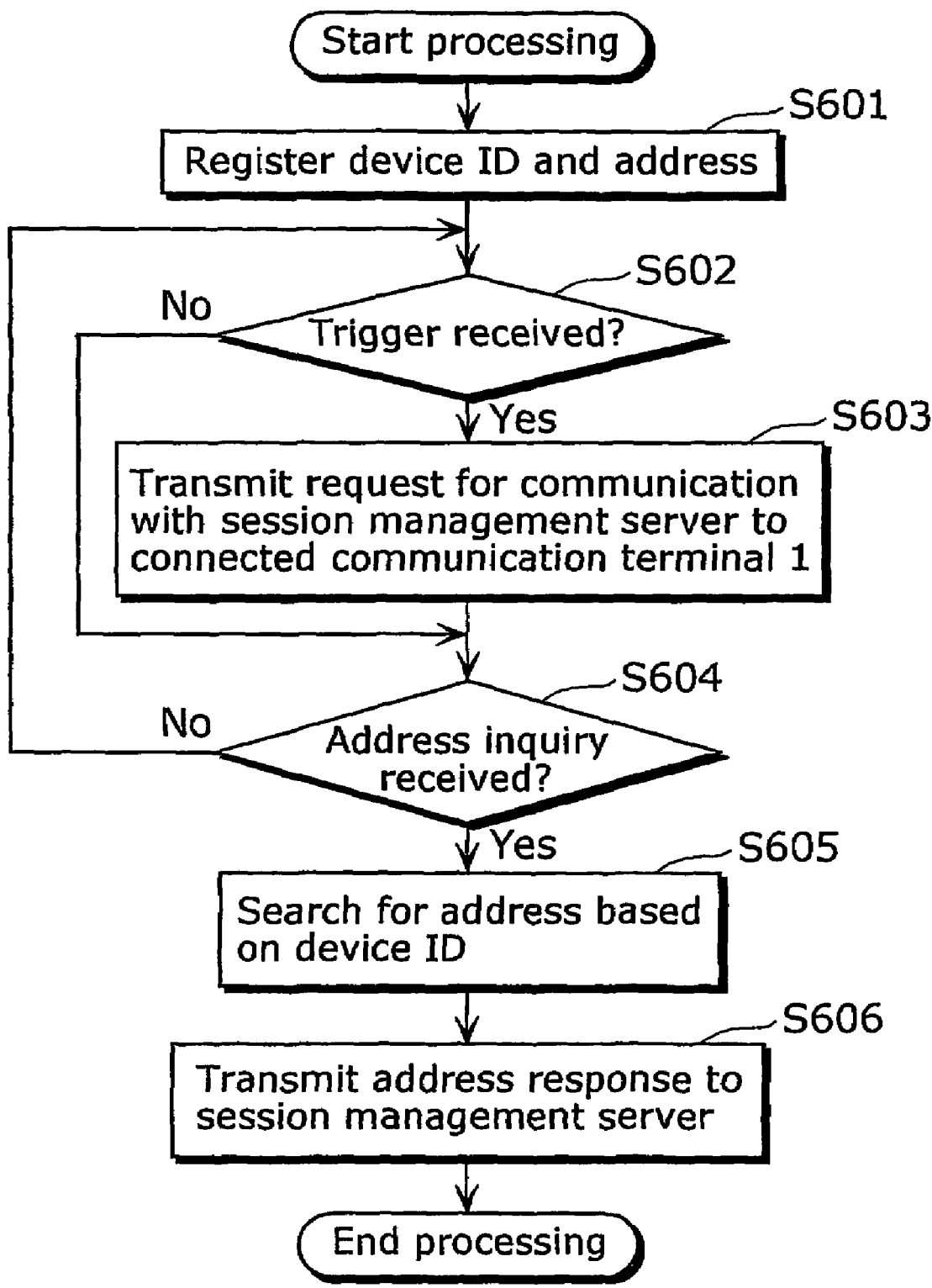
FIG. 6 is a flowchart showing a procedure in the operation performed by the trigger server according to the first embodiment.

FIG. 6 is a flowchart showing a procedure in the operation performed by the trigger server 5 according to the present embodiment.

Firstly, the storage unit 51 in the trigger server 5 receives a pair of address and device ID respectively from the connected communication terminal 1 and the connecting communication terminal 3, and stores them into the database 56 as an address table 56a (S601).

When receiving a trigger from the session management server 4 (Yes in S602), the trigger processing unit 52 transmits, to the connected communication terminal 1, a request for communication with the session management server 4 (S603).

When receiving an address inquiry from the session management server 4 (S604), the address response unit 54 extracts, based on the device IDs, the corresponding addresses of the connecting communication terminal 3 and the connected communication terminal 1 from the address table 56a stored in the database 56 (S605). Lastly, the communication unit 55 transmits the extracted addresses to the session management server 4 as an address response (S606).

Figure 7:
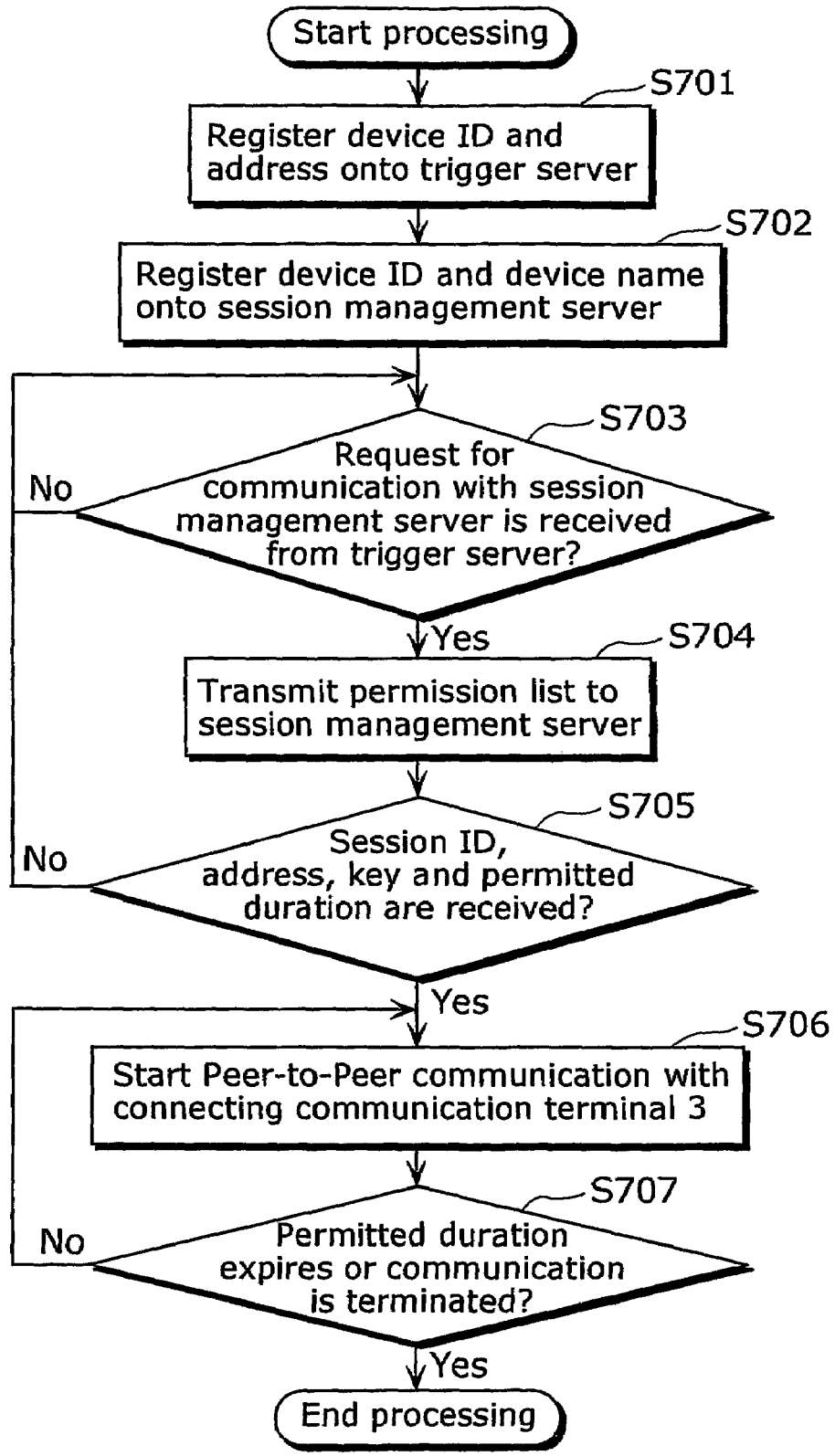
FIG. 7 is a flowchart showing a procedure in the operation performed by the connected communication terminal according to the first embodiment.

FIG. 7 is a flowchart showing a procedure in the operation performed by the connected communication terminal 1 according to the first embodiment.

Firstly, the registration unit 11 in the connected communication terminal 1 transmits a pair of the device ID and the address of the connected communication terminal 1 to the trigger server 5 (S701), and transmits a pair of the device ID and the device name of the connected communication terminal 1 to the session management server 4 (S702). With such processing, data such as device IDs is stored beforehand into the respective servers 4 and 5.

Then, when receiving, from the trigger server 5, the request for communication with the session management server 4 (Yes in S703), the polling unit 13 performs polling for the session management server 4. The permission list transmission unit 12 transmits the permission list L to the session management server 4 (S704).

When the address resolution unit 14 receives the address notification 410 shown in FIG. 4B from the session management server 4 (Yes in S705), the Peer-to-Peer communication unit 15 starts, using the session ID 411, the key 413 and the permitted duration 414, the communication with the connecting communication terminal 3 corresponding to the address 412 (S706).

In the case when all the data communication with the connecting communication terminal 3 is completed, or in the case when sixty minutes indicated in the permitted duration 414 has elapsed, the Peer-to-Peer communication unit 15 terminates the communication with the connecting communication terminal 3 (Yes in S707).

Figure 8:
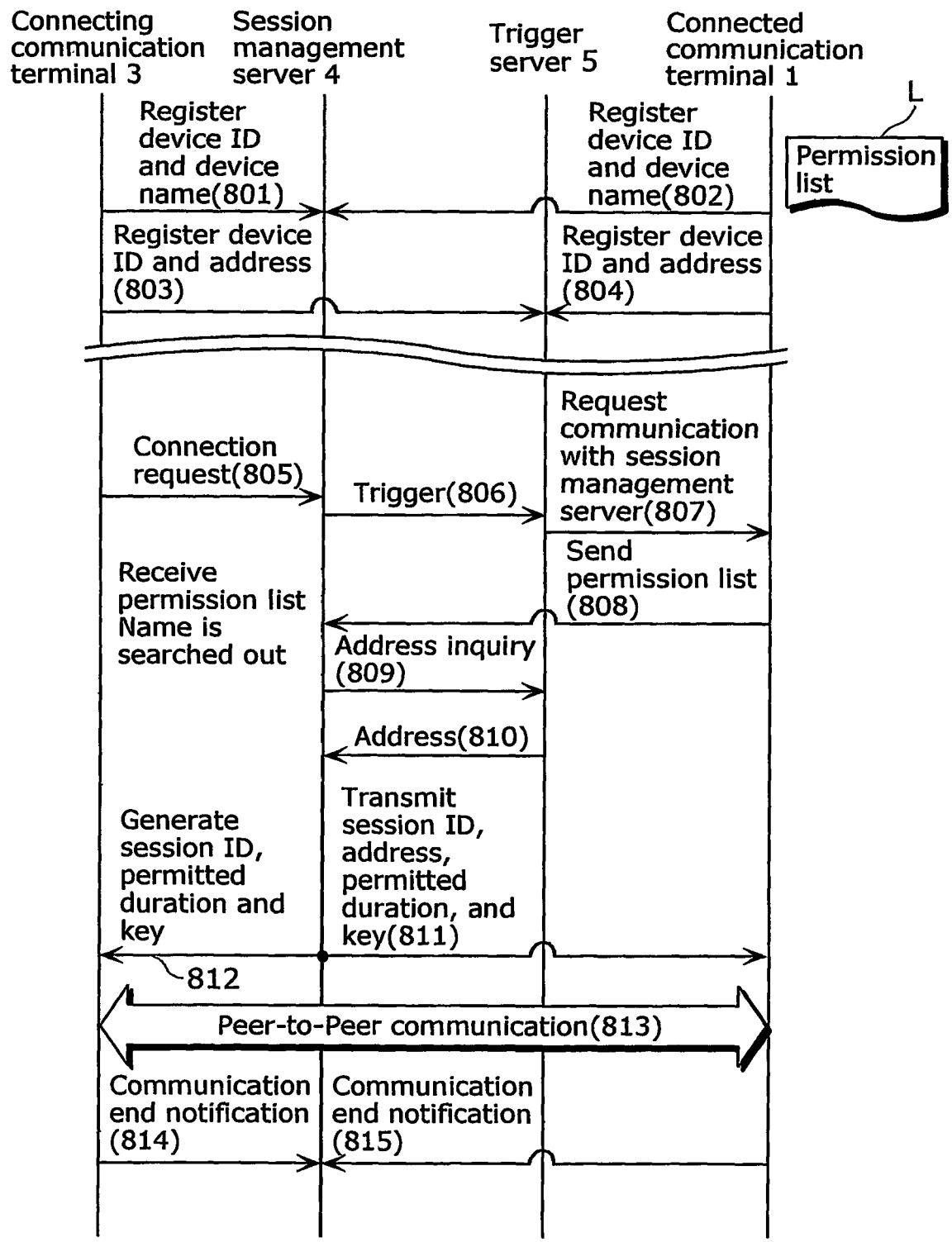
FIG. 8 is a diagram showing a communication sequence in the whole communication system made up of the connected communication terminal, the session management server, the trigger server and the connecting communication terminal, according to the first embodiment.

FIG. 8 is a diagram showing a communication sequence in the whole communication system made up of the connected communication terminal 1, the session management server 4, the trigger server 5 and the connecting communication terminal 3, according to the first embodiment. Note that the routers 6 and 7 are placed, as relay apparatuses, between the connecting communication terminal 3 and the connected communication terminal 1, and the network 2, and that the present invention utilizes the nature of routers in the case of using a connectionless-type UDP as a communication protocol. In other words, the present invention makes use of the tendency that the respective routers 6 and 7 hold a correlation between local address and global address for a certain period of time for sending and receiving packet data. This is due to the communication using the contactless-type UDP in which whether or not response is received from the other end of the communication is not known. Note that in TCP, the respective routers 6 and 7 create a conversion table when a two-way connection is established for data communication, and have a system of deleting the correlation between local address and global address when the connection is cut off.

First, the connecting communication terminal 3 and the connected communication terminal 1 respectively perform registration of device ID and device name onto the session management server 4 (801 and 802), and performs registration of address and device ID onto the trigger server 5 (803 and 804).

In the case when the connecting communication terminal 3 requests a connection to the connected communication terminal 1, the connecting communication terminal 3 transmits a connection request (805) in which the device name shown in FIG. 3 is described. The session management server 4 then transmits, to the trigger server 5, a trigger (806) for requesting a communication with the connected communication terminal 1. Note that, here, address notification packet data is regularly transmitted from the respective connecting communication terminal 3 and connected communication terminal 1. It is therefore possible for the trigger server 5 to obtain real-time the IP address of the connected communication terminal 1, using device ID.

Then, the connected communication terminal 1, having received the request (807) for the connection with the session management server 4, transmits the permission list L held in the permission list database 17 to the session management server 4 (808).

The session management server 4 judges whether or not the device name of the connecting communication terminal 3 is found in the permission list L. In the case when the device name is found, the session management server 4 inquires the trigger server 5 of the address (809).

Having obtained, from the trigger server 5, the addresses of the connecting communication terminal 3 and the connected communication terminal 1 (810), the session management server 4 generates a session ID, a permitted duration, a key to be used for Peer-to-Peer communication, and transmits the data shown in FIG. 4 to the respective connecting communication terminal 3 and connected communication terminal 1 (811 and 812).

After the Peer-to-Peer communication between the connecting communication terminal 3 and the connected communication terminal 1 starts (813). Note that in the case when the communication is terminated, it is conceivable that the respective terminals send a communication end notification (814 and 815) so that the session management server 4 can manage call duration or the like. It should be also noted that a UDP protocol may be used as a communication protocol for sending the request (807) for the communication with the session management server 4, while a different communication protocol such as a TCP protocol may be used for other sessions (801 to 806, 808 to 815).

Figures 9A, 9B, 9C:
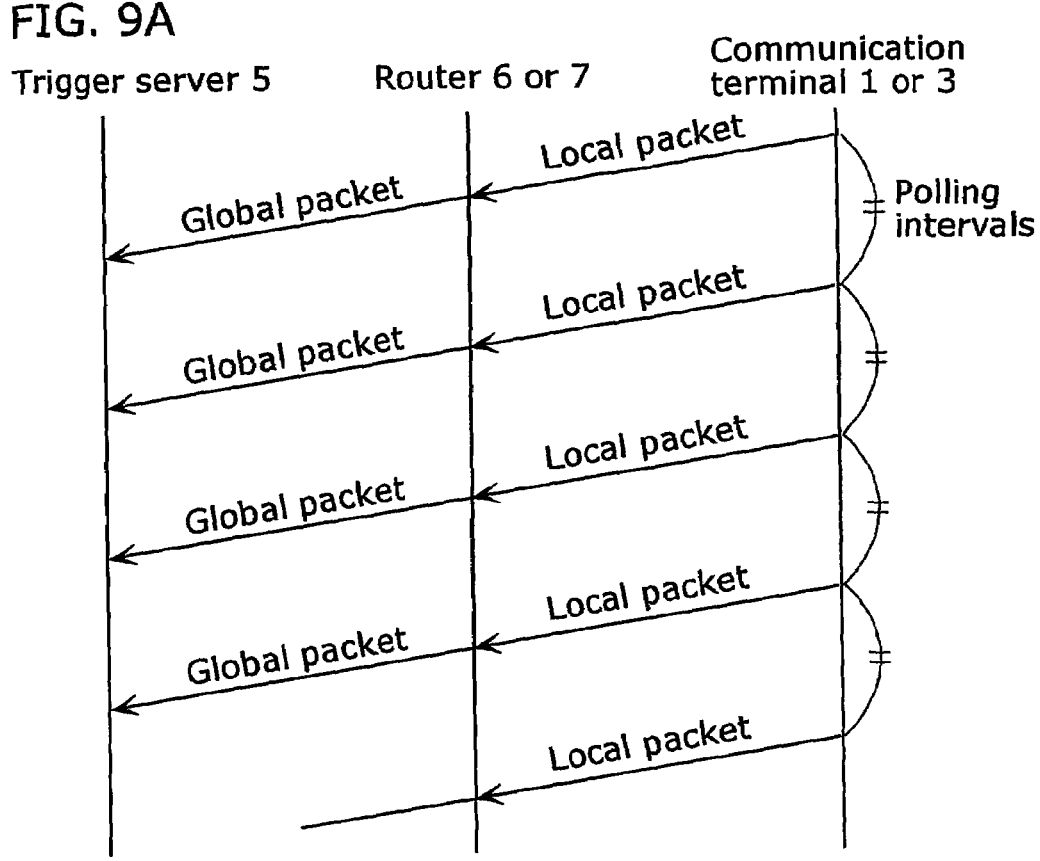
FIG. 9A is a sequence diagram for sending and receiving address notification data between the connecting communication terminal or the connected communication terminal, and a router, according to the first embodiment.
FIG. 9B is a reference diagram showing a packet data to be transmitted from the connected communication terminal or the connecting communication terminal to the corresponding router.
FIG. 9C is a reference diagram of a correspondence table held by the respective router.

FIG. 9A is a sequence diagram for sending and receiving address notification data between the connecting communication terminal 3 and the connected communication terminal 1, and the routers 6 and 7, according to the first embodiment. The routers 6 and 7, in general, relay the data to be sent or received via both the external and internal networks, and have the function to convert, from global to local, the IP address described in the IP header, and to intentionally discard the packet data that satisfies the pre-set conditions. As shown in the present diagram, the communication terminals 1 and 3 regularly transmit, using the connectionless-type UDP, the local packet intended for address notification. The routers 6 and 7 can therefore always hold the correlation between the local addresses of the communication terminals 1 and 3 and global addresses. Also, the trigger server 5 can properly manage the global addresses of the communication terminals 1 and 3, therefore, it is possible for the trigger server 5 to transmit real-time, to the connected communication terminal 1, the connection request made by the connecting communication terminal 3.

The local packet shown in FIG. 9A is a packet data 901 to be transmitted from the communication terminal 1 or 3 to the router 6 or 7. As shown in FIG. 9B, the packet data 901 is made up of a header section that includes a destination address, a destination port number, a source address, a source port number, and a data section. The source address includes the local addresses of the communication terminals while the destination address includes the global address of the trigger server 5.

A global packet is packet data to be transmitted from the router 6 or 7 to the trigger server 5. The router converts the source address and the source port number into the global address that is unique to the router 6 or 7. The source address includes the global address of the router 6 or 7 while the destination address includes the global address of the trigger server 5.

The communication terminal 1 or 3 transmits a local packet to the router 6 or 7 at regular polling intervals (e.g. three minutes). The correlation between the local address of the local packet transmitted to the router 6 or 7 and the global address normally disappears after the retention period has elapsed. According to the present invention, however, packet data is transmitted at regular polling intervals before the retention period is passed. The router 6 or 7 thus always keeps the correlation between local addresses and global addresses. The router can therefore convert, from global to local, the destination address in order to transmit the request for communication with the session management server 4, from the trigger server 5 on the global side. The router 6 or 7 can thus relay the converted address to the connected communication terminal 1.

FIG. 9C is a reference diagram of a correspondence table 902 held by the router 6 or 7. In the correspondence table 902, the local address and the port number of the local network and the global address and the port number of the external network are described in one-to-one correspondence. When receiving a local packet, the router 6 or 7 converts the source address, which is included in the local packet in order to effectively use the global address, into the global address of the router 6 or 7. The router 6 or 7 then converts the source port number into the port number at which the router 6 or 7 can receive, generates a global packet, and transmits the global packet to the trigger server 5.

As described above, in the communication system according to the first embodiment, the session management server 4 can obtain the permission list L held by the connected communication terminal 1 only when the connecting communication terminal 3 transmits the name of the device at the other end of the communication, with which communication is requested. The session management server 4 can also judge whether or not the communication is permitted with reference to the permission list L, and Peer-to-Peer communication between the connecting communication terminal 3 and the connected communication terminal 1 is performed only in the case when the communication is permitted. Thus, it is possible to improve authenticity of the communication between the communication terminals.

Since the trigger server 5 always manages the address information of the connected communication terminal 1, the trigger server 5 can transmit, to the connected communication terminal 1, a request for communication with the session management server 4. It is therefore possible to realize Peer-to-Peer communication as well as a real-time judgment on whether or not communication is permitted.

Moreover, due to the fact that the connecting communication terminal 3 and the connected communication terminal 1 previously set an encryption method and a permitted duration for the session management server 4, it is possible for the session management server 4 to manage more appropriately the communication between the communication terminals.

Note that, in the first embodiment, the session management server 4 and the trigger server 5 are assumed to be independent server apparatuses, however, a single server apparatus may have the functions equipped with such servers. The number of communication terminals is assumed to be two: one is a connected communication terminal 1 and the other is a connecting communication terminal 3. The number, however, may be three or more. It is also described that the device name of the connected communication terminal 1 is "TERM1", the device name of the connecting communication terminal 3 is "TERM3", the device ID of the connected communication terminal 1 is "0001", the device ID of the connecting communication terminal 3 is "0003", the session ID is "S0001", and the permitted duration is "sixty minutes". The present invention, however, is not limited to the referential marks and numbers.

Second Embodiment

The following describes the communication system according to the second embodiment of the present invention. Note that the second embodiment is characteristic in that the connected communication terminal holds the permission list, judges on whether or not connection is permitted to the connecting communication terminal, and transmits the permission list to the session management server.

Figure 10:
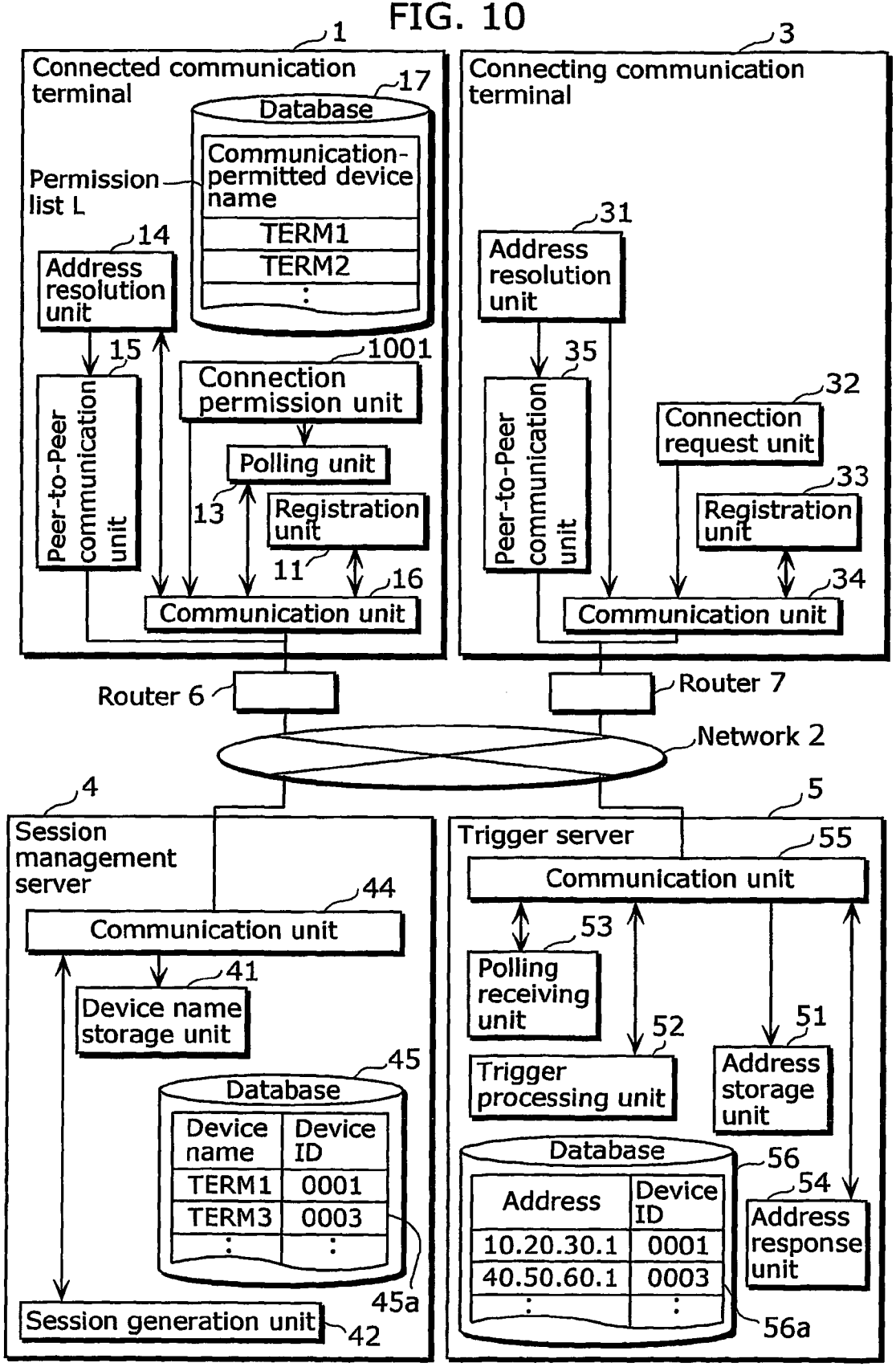
FIG. 10 shows an overall structure of the communication system according to a second embodiment of the present invention.

FIG. 10 shows an overall structure of the communication system according to the second embodiment. The communication system includes the connected communication terminal 1, the network 2, the connecting communication terminal 3, the session management server 4, the trigger server 5, and the routers 6 and 7. Note that, in the second embodiment, the same referential marks are put for the same components as those in the communication system according to the first embodiment, and the description is not repeated here.

The connected communication terminal 1 includes a connection permission unit 1001 instead of the permission list transmission unit 12 that is a component of the connected communication terminal 1 according to the first embodiment.

In the case when the communication unit 16 receives, from the trigger server 5, a request for search in list that is made to the session management server 4, the connection permission unit 1001 searches in the permission list L stored in the database 17, and judges whether or not the connection to the connecting communication terminal 3 is permitted, and transmits the result to the session management server 4.

Note that the name search unit 43 shown in the first embodiment is omitted from the session management server 4 according to the second embodiment since the connection permission unit 1001 in the connected communication terminal 1 judges whether or not the connection is permitted. The structures of the connecting communication terminal 3 and the trigger server 5 are the same as those described in the first embodiment.

Figure 11:
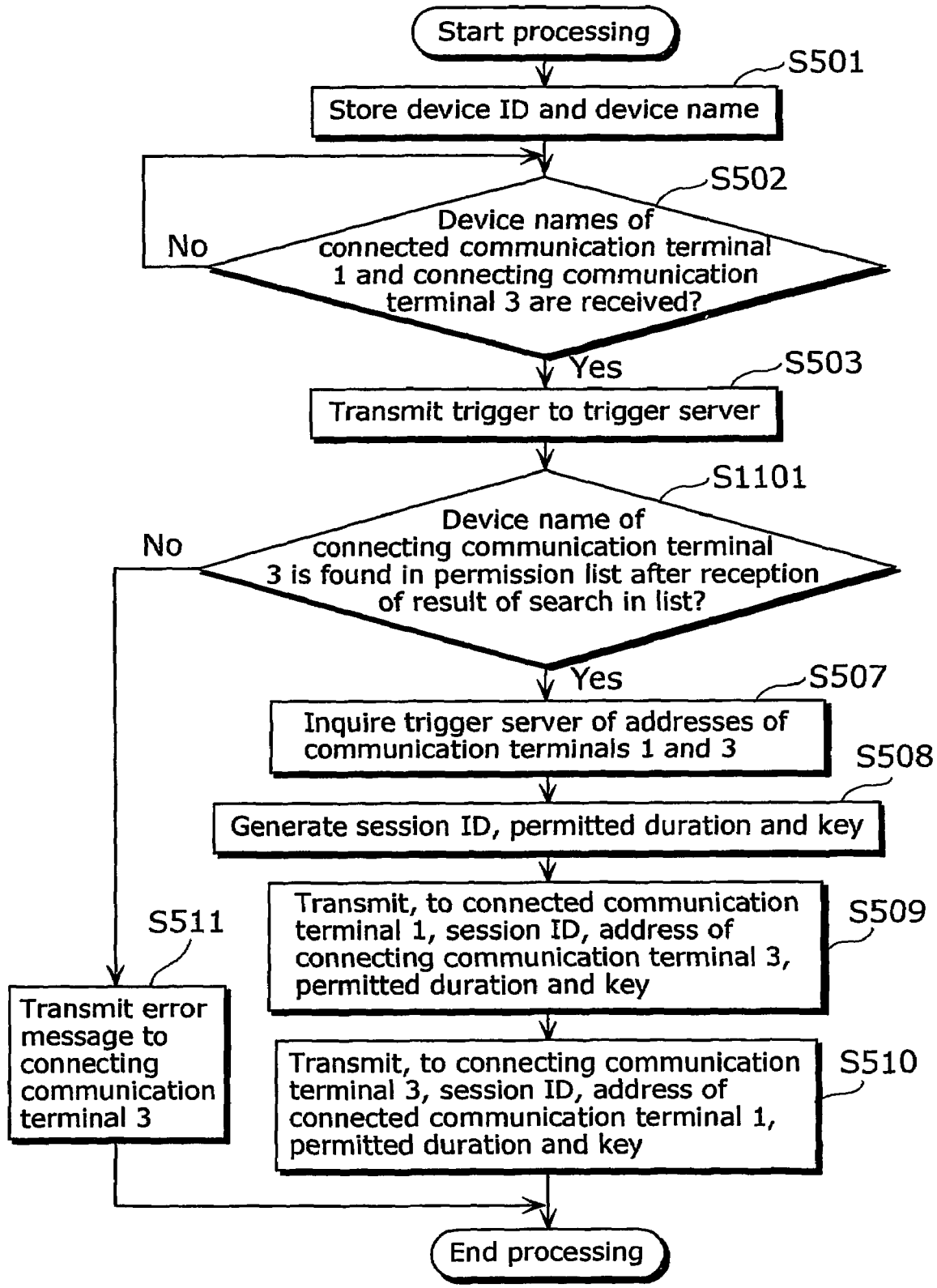
FIG. 11 is a flowchart showing a procedure in the operation performed by the session management server according to the second embodiment.

FIG. 11 is a flowchart showing a procedure in the operation performed by the session management sewer 4 according to the second embodiment. Note that the same numbers are used for the steps indicating the same operation as performed by the session management server 4 shown in FIG 5.

Firstly, the device name storage unit 41 in the session management server 4 receives a pair of device name and device ID from the respective connected communication terminal 1 and connecting communication terminal 3, and stores them into the database 45 (S501). Then, when receiving the connection request shown in FIG. 3 from the connecting communication terminal 3 (Yes in S502), the session generation unit 42 transmits, to the trigger server 5, a trigger for requesting the connected communication terminal 1 to send the result of the judgment on whether or not the Peer-to-Peer communication with the connecting communication terminal 3 is permitted (S503).

Then, the session generation unit 42 receives the result of search from the connected communication terminal 1. In the case of receiving the result indicating that the device name of the connecting communication terminal 3 is written in the permission list L (Yes in S1101), the session generation unit 42 inquires of the addresses of the connected communication terminal 1 and the connecting communication terminal 3 (S507).

Having received, as a response to the inquiry, the addresses of the connecting communication terminal 3 and the connected communication terminal 1, the session generation unit 42 generates information such as a session ID, a permitted duration and a key to be used for the communication between the connected communication terminal 1 and the connecting communication terminal 3 (S508).

Then, the communication unit 44 transmits, to the connecting communication terminal 3, the session ID, the address of the connected communication terminal 1, the permitted duration and the key, as an address notification 400 (S509). The communication unit 44 also transmits, to the connected communication terminal 1, the session ID, the address of the connecting communication terminal 3, the permitted duration and the key, as an address notification 410 (S510). Here, the information included in the address notification is the same as that shown in FIG. 4 in the first embodiment. Note that, in the case of receiving the result indicating that the device name of the connecting communication terminal 3 is not found in the permission list L (No in S1101), the session generation unit 42 transmits an error message to the connecting communication terminal 3 (S511).

Figure 12:
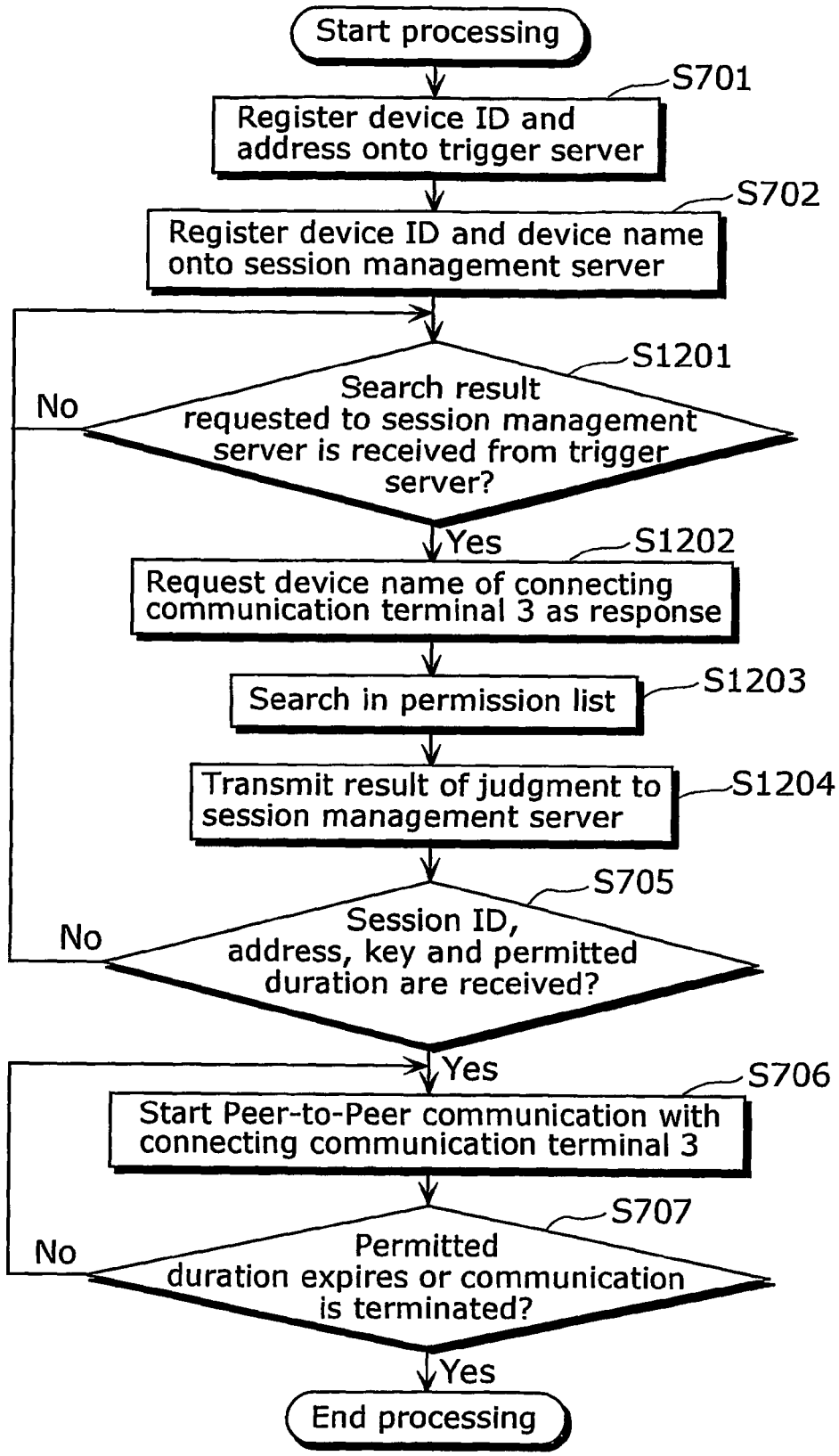
FIG. 12 is a flowchart showing a procedure in the operation performed by the connected communication terminal according to the second embodiment.

FIG. 12 is a flowchart showing a procedure in the operation performed in the connected communication terminal 1 according to the second embodiment.

First, the registration unit 11 in the connected communication terminal 1 transmits a pair of device ID and address of the connected communication terminal 1, to the trigger server 5 (S701), and transmits a pair of device ID and device name of the connected communication terminal 1 to the session management server 4 (S702).

Then, in the case of receiving, from the trigger server 5, a request for search result which is made to the session management server 4 (Yes in S1201), the polling unit 13 requests the session management server 4 to send, as a response, the device name of the connecting communication terminal 3 (S1202). In the meantime, the connection permission unit 1001 judges whether or not the obtained device name is found in the permission list L (S1203). In the case when the device name is found in the permission list L, the connection permission unit 1101 transmits, to the session management server 4, a signal indicating that the communication is permitted (S1204).

When the address resolution unit 14 receives, from the session management server 4, the address notification 410 as shown in FIG. 4B (Yes in S705), the Peer-to-Peer communication unit 15 starts, using the session ID 411, the key 413, the permitted duration 414, the Peer-to-Peer communication with the connecting communication terminal 3 corresponding to the address 412 (S706).

In the case when all the data communication with the connecting communication terminal 3 is completed, or in the case when the permitted duration 414 expires, the Peer-to-Peer communication unit 15 terminates the communication with the connected communication terminal 1 (Yes in S707). Note that the procedure in the operations performed respectively by the connecting communication terminal 3 and the trigger server 5 are the same as those described in the first embodiment. The detailed description is therefore not repeated here.

Figure 13:
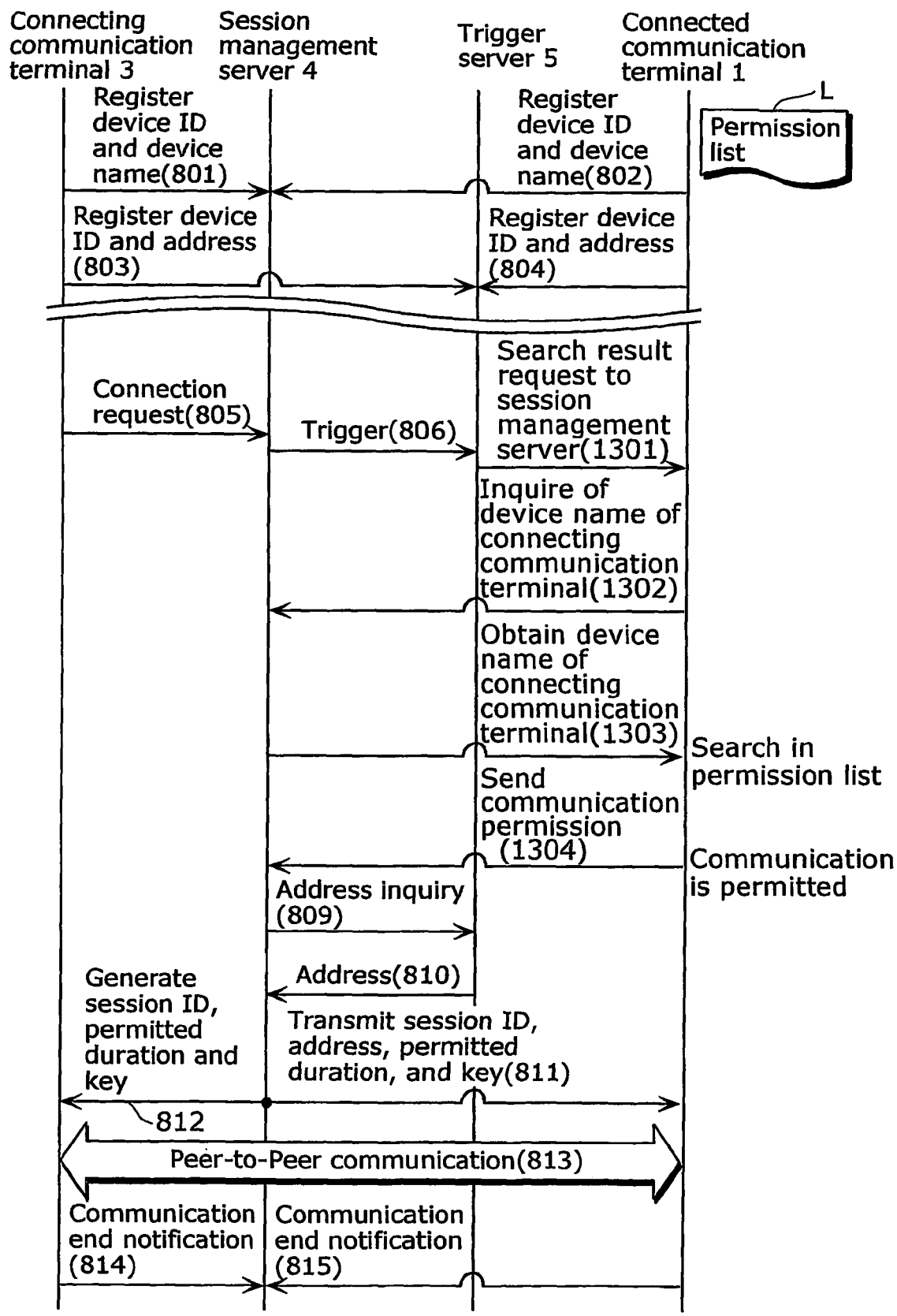
FIG. 13 is a diagram showing a communication sequence in the communication system made up of the connected communication terminal, the session management server, the trigger server and the connecting communication terminal, according to the second embodiment.

FIG. 13 is a diagram showing a communication sequence in the communication system made up of the connected communication terminal 1, the session management server 4, the trigger server 5 and the connecting communication terminal 3, according to the second embodiment. Note that the same referential marks are used for the same processing as in FIG. 8 described above, and the detailed description is not repeated here.

First, the connecting communication terminal 3 and the connected communication terminal 1 respectively register the device ID and the device name into the session management server 4 (801 and 802). The respective connecting communication terminal 3 and the connected communication terminal 1 also register the address and the device ID into the trigger server 5 (803 and 804).

Next, in the case of requesting a connection to the connected communication terminal 1, the connecting communication terminal 3 transmits, to the session management server 4, a connection request (805) in which the device name shown in FIG. 3 is written, and transmits, to the trigger server 5, a trigger (806) for requesting the result of the search that is made in the permission list L.

Then, having received the request for the search result (1301) that is made to the session management sewer 4, the connected communication terminal 1 inquires the session management sewer 4 of the device name of the connecting communication terminal (S1302). In the case of receiving the device name of the connecting communication terminal 3 from the session management sewer 4 (1303), the connection permission unit 1001 judges on the possibility for the connection with reference to the permission list L, and sends back a communication permission to the session management server 4 in the case when the connection is permitted (1304). Note that the procedure performed thereafter is the same as that shown in FIG. 8.

As described above, in the communication system according to the second embodiment, the connected communication terminal 1 holds the permission list L, and the connection permission unit 1001 makes a judgment on the connecting communication terminal 3 in order to permit the connection to the connecting communication terminal 3. It is therefore possible to prevent the address of the connected communication terminal 1 from being passed to the ill-intentioned third party, and to enhance the authenticity of the communication between communication terminals.

The session management server 4 can obtain, from the connected communication terminal 1, the result of the search made in the permission list L. It is therefore also possible to reduce the loads of processing executed by the session management server 4 since there is no need to obtain the permission list L from the connected communication terminal 1.

Third Embodiment

The following describes the communication system according to the third embodiment of the present invention. Note that the third embodiment provides a method to properly manage a communication duration permitted for the communication between the communication terminals (hereinafter to be referred to as "permitted duration").

Figure 14:
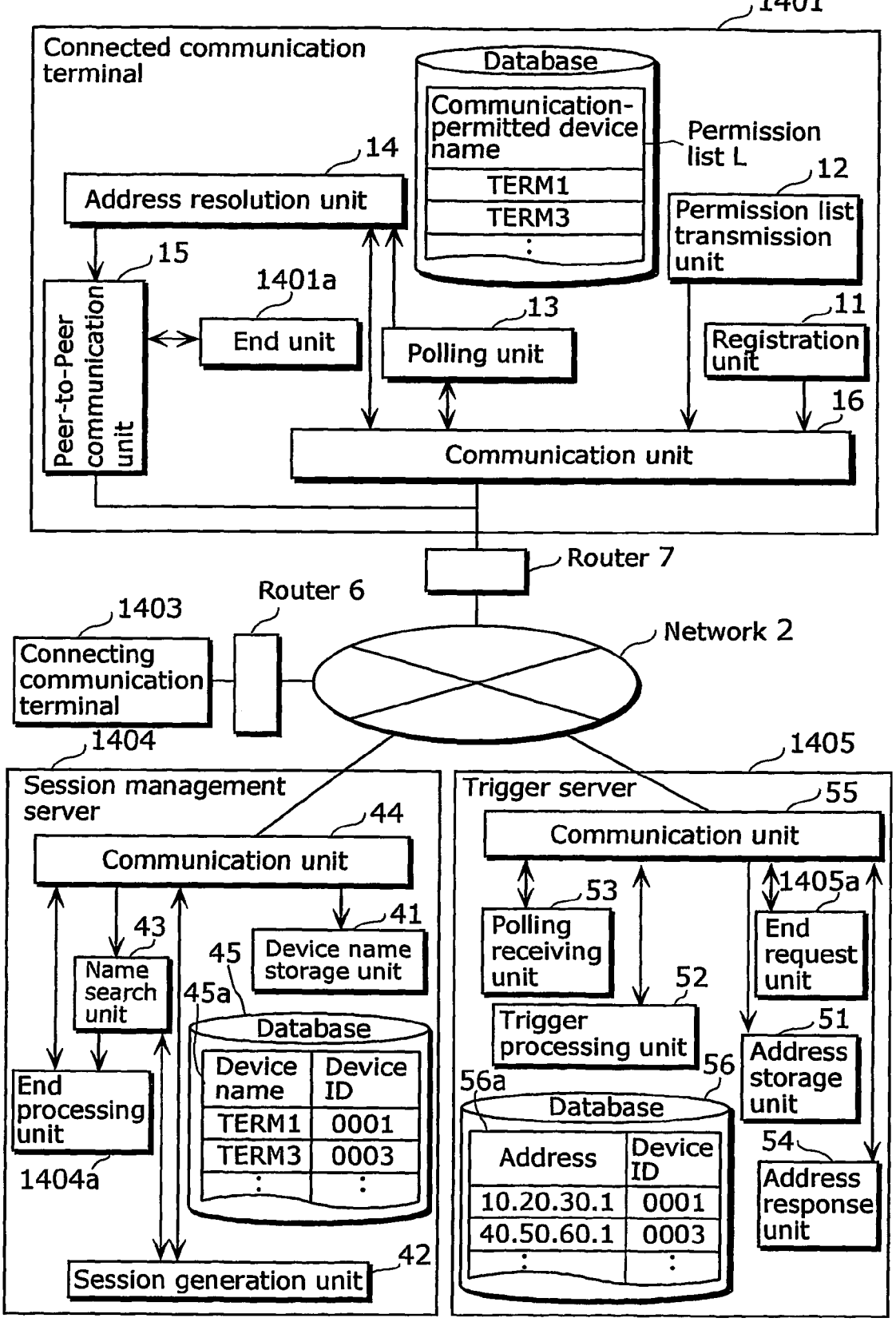
FIG. 14 shows an overall structure of the communication system according to a third embodiment of the present invention.

FIG. 14 is an overall structure of the communication system according to the third embodiment. Note that, in FIG. 14, the same referential marks are used for the same components as shown in FIG. 1, and the description is not repeated here.

The connected communication terminal 1401 includes, in addition to the processing units included in the connected communication terminal 1 described in the previous embodiments, an end unit 1401a which transmits a request for extension of permitted duration to a session management server 1404, receives a new permitted duration time from the session management server 1404 and a communication end request from a trigger server 1405, and transmits an end notification to the session management server 1404 in the case when the communication with the connecting communication terminal 1403 is terminated.

The connecting communication terminal 1403 includes the same processing units as those included in the connected communication terminal 1401.

The session management server 1404 includes, in addition to the processing units included in the session management server 4 according to the first embodiment, an end processing unit 1404a. The end processing unit 1404a receives the request for an extension of the permitted duration from the connected communication terminal 1401 or the connecting communication terminal 1403, transmits a new permitted duration time, transmits, to the trigger server 1405, a communication end request for terminating the communication between the connected communication terminal 1401 and the connecting communication terminal 1403, and receives an end notification from the connected communication terminal 1401 or the connecting communication terminal 1403.

The trigger server 1405 includes, in addition to the processing units included in the trigger server 5, an end request unit 1405*a* which receives a communication end request from the session management server 1404, and transmits the communication end request to the connected communication terminal 1401 or the connecting communication terminal 1403.

Figure 15:
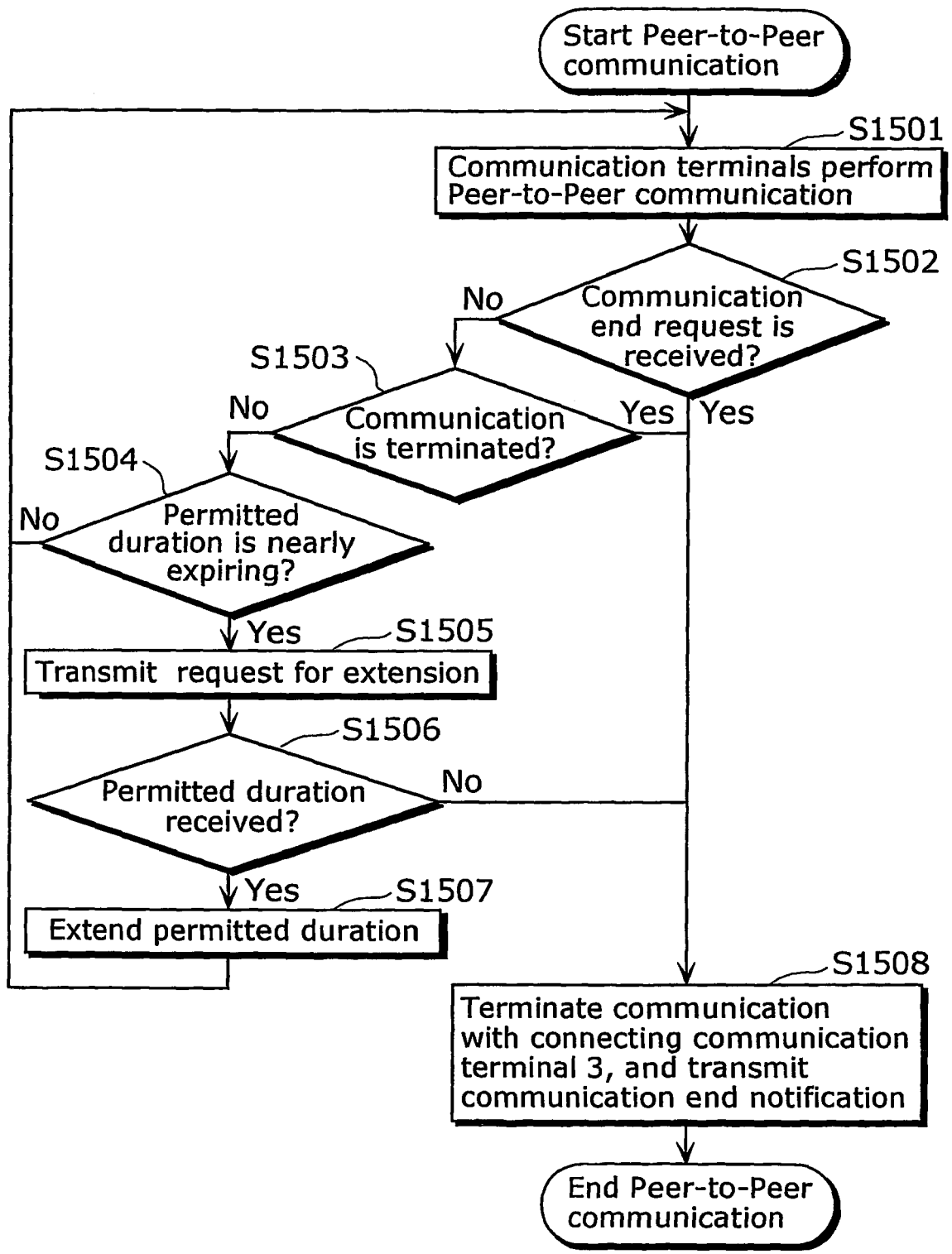
FIG. 15 is a flowchart showing a procedure in the operation performed by the Peer-to-Peer communication between the connected communication terminal and the connecting communication terminal, according to the third embodiment.

FIG. 15 is a flowchart showing a procedure in the operation performed during the Peer-to-Peer communication between the connected communication terminal 1401 and the connecting communication terminal 1403 according to the third embodiment. Note that the operation until the start of the Peer-to-Peer communication is the same as S201 to S205 shown in FIG. 2 and S701 to S705 in FIG. 7.

Firstly, in the case of receiving a communication end request from the end request unit 1405*a* included in the trigger server 1405 while the communication terminals communicate (Yes in S1502), the end unit 1401*a* terminates the communication and transmits an end notification to the session management server 1404 (S1508).

In the case when neither a communication end notification is received (No in S1502) nor the data communication is completed (No in S1503), a comparison between the permitted duration and the time elapsed since the start of the communication (S1504). For example, when the communication continues and reaches 70% of the permitted duration, it is judged that the permitted duration is "nearly expiring". In the first embodiment, the session management server 4 specifies sixty minutes as a permitted duration in the address notifications 400 and 401. In the case when the data communication is not completed even after forty-two minutes passes since the start of the communication between the connected communication terminal 1401 and the connecting communication terminal 1403 (Yes in S1504), the end unit 1401*a* judges the permitted duration as "nearly expiring", and transmits, to the session management server 1404, a request for extension of the permitted duration (S1505).

Then, in the case of receiving a new permitted duration from the session management server 1404 (Yes in S1506), the end unit 1401*a* extends the permitted duration (S1507) and continues the communication between the connected communication terminal 1401 and the connecting communication terminal 1403.

Figure 16:
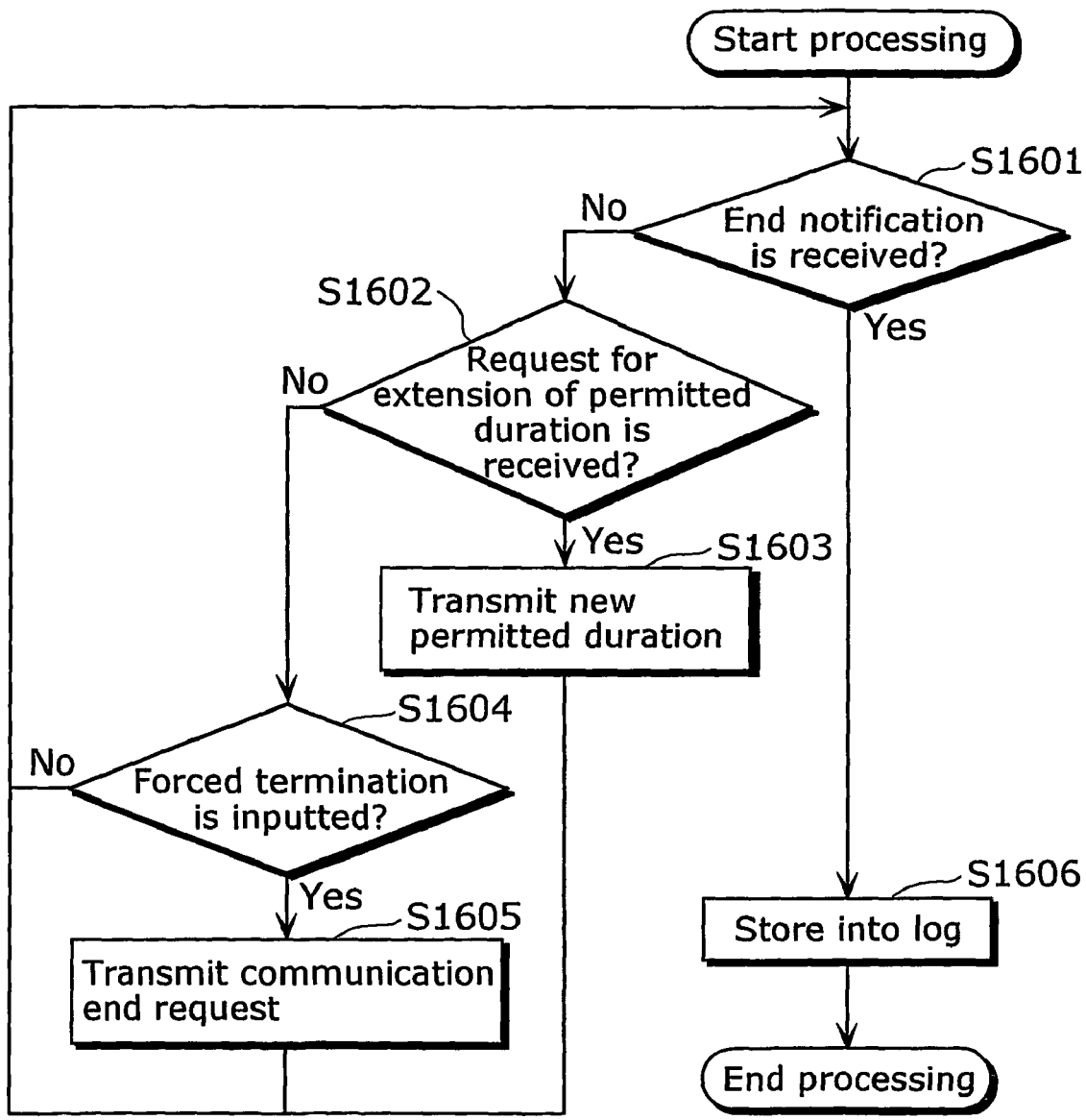
FIG. 16 is a flowchart showing a procedure in the operation performed by an end processing unit in the session management server according to the third embodiment.
Figure 17:
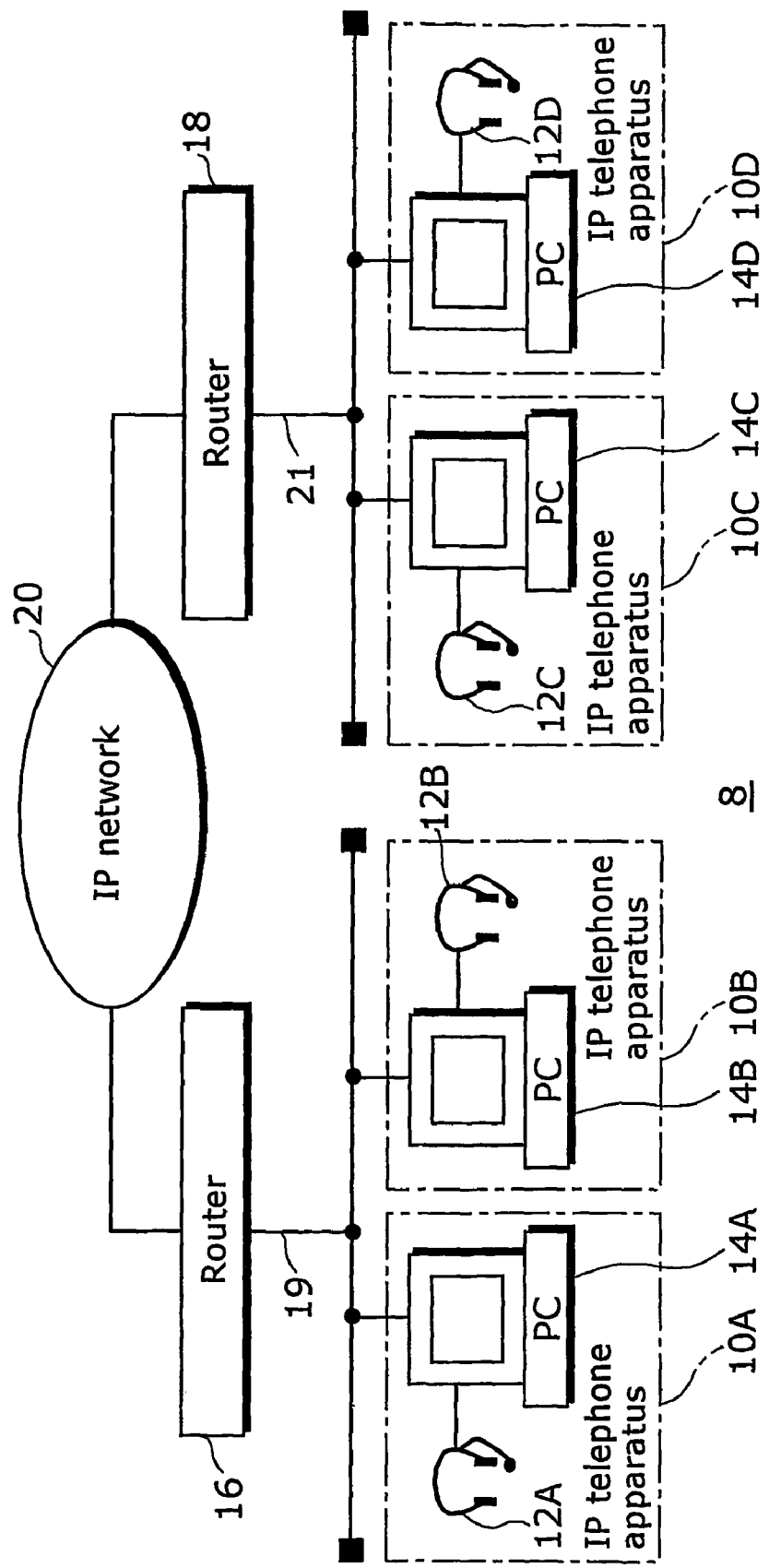
FIG. 17 is a diagram showing a configuration of the communication system using the conventional IP telephone apparatuses.

FIG. 16 is a flowchart showing a procedure in the operation performed by the end processing unit 1404*a* included in the session management server 1404 according to the third embodiment.

The name search unit 43 transmits the address notification 410 to the connected communication terminal 1401, and the address notification 400, to the connecting communication terminal 1403. After that, in the case of receiving an end notification from the connected communication terminal 1401 or the connecting communication terminal 1403 (Yes in S1601), the end processing unit 1404*a* stores the end notification into a log (S1606).

In the case when an end notification is not received (No in S1601) but a request for the extension of the permitted duration is received from the connected communication terminal 1401 or the connecting communication terminal 1403 (Yes in S1602), the permitted duration is newly set and then transmitted to the communication terminal, that is, a sender of the request for extension of the permitted request (S1603).

In the case when the request for the extension of the permitted duration is not received (No in S1602), and the connected communication terminal 1401 and the connecting communication terminal 1403 are forced to terminate the communication for some reason (Yes in S1604), a communication end request is transmitted to the trigger server 1405 (S1605).

When receiving a communication end request from the session management server 1404, the end request unit 1405*a* included in the trigger server 1405 transmits a communication end request to the connected communication terminal 1401 or the connecting communication terminal 1403.

As described above, in the communication system according to the third embodiment, it is possible for the session management server 1404 to extend a permitted duration or to forcedly terminate the communication between the connecting communication terminal 1403 and the connected communication terminal 1401, according to the state of the communication. The session management server 1404 can thus manage the communication based on Peer-to-Peer communication more appropriately.

Note that, in the third embodiment, 70% is set as a criterion for the judgment on whether or not the permitted duration is nearly expiring, however, a different criterion may be used instead. Also, the session management server 1404 stores an end notification after receiving it, however, the session management server 1404 may perform other processing after the reception of the end notification.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The connecting communication terminal and the connected communication terminal according to the present invention are useful, for example, as terminal apparatuses used for IP telecommunication. The communication terminals according to the present invention are applicable to services for exchanging a massive amount of data such as picture data and audio data between the communication terminals in the Peer-to-Peer communication.

The invention claimed is:

1. A connected communication terminal that communicates with a connecting communication terminal that requests direct communication via a network, said connected communication terminal comprising:

a registration unit operable to register (i) a pair of a device ID and a device name onto a session management server that manages sessions between the communication terminals, and (ii) a pair of the device ID and an address of the connected communication terminal onto a trigger server that notifies the connected communication terminal of a request for a communication with the session management server, the device ID identifying the connected communication terminal, and the device name indicating a name of the connected communication terminal;

a holding unit operable to hold a permission list that is a list of device names of communication terminals to which direct communication is permitted;

a polling unit operable to perform polling on the trigger server so as to receive the request for the communication with the session management server from the trigger server;

an address resolution unit operable to receive, from the session management server, at least an address of the connecting communication terminal and a session ID that is unique to the communication with the connecting communication terminal; and a Peer-to-Peer communication unit operable to perform direct communication with the connecting communication terminal in the case when the address of the connecting communication terminal and the session ID are received.

2. The connected communication terminal according to claim 1, further comprising
a list transmission unit operable to transmit the permission list to the session management server in the case when the request for the communication with the session management server is received.

3. The connected communication terminal according to claim 1, further comprising
an inquiry unit operable to inquire the session management server of the device name of the connecting communication terminal in the case when the request for the communication with the session management server is received;
a judgment unit operable to judge whether or not the device name is included in the permission list in the case of receiving the device name from the session management server; and
a judgment result transmission unit operable to transmit a result of judgment made by said judgment unit to the session management server.

4. The connected communication terminal according to claim 1,
wherein the permission list includes device names of communication terminals to which direct communication is refused.

5. The connected communication terminal according to claim 1,
wherein said address resolution unit is operable to receive, from the session management server, at least the address of the connecting communication terminal, the session ID, and a permitted duration during which the communication between the communication terminals is permitted, and
said Peer-to-Peer communication unit is operable to start a Peer-to-Peer communication with the connecting communication terminal, and to terminate the communication in the case when all of data communication is completed or where the permitted duration expires.

6. The connected communication terminal according to claim 5,
wherein said Peer-to-Peer communication unit is operable to transmit a permitted-duration extension request for requesting an extension of the permitted duration, in the case when the communication with the connecting communication terminal continues after the permitted duration expires.

7. The connected communication terminal according to claim 5,
wherein said address resolution unit is operable to receive, from the session management server, the address of the connecting communication terminal, the session ID, an encryption communication key, and the permitted duration during which the communication between the communication terminals is permitted, and
said Peer-to-Peer communication unit is operable to perform encryption on data using the encryption communication key during the communication with the connecting communication terminal.

8. The connected communication terminal according to claim 1, further comprising
an end notification unit operable to send a communication end notification to the session management server in the case when the communication with the connecting communication terminal is terminated.

9. The connected communication terminal according to claim 1,
wherein said Peer-to-Peer communication unit is operable to terminate the communication with the connecting communication terminal in the case when a communication end command is received from the trigger server.

10. The connected communication terminal according to claim 1, further comprising
a data transmission unit operable to regularly transmit address notification data to the trigger server, the address notification data being made up of (i) a header section that includes at least the address of the connected communication terminal and an address of the trigger server, and (ii) a data section that includes at least the device ID of the connected communication terminal.

11. A connecting communication terminal that performs direct communication with a connected communication terminal via a network, said connecting communication terminal comprising:
a registration unit operable to register (i) a pair of a device ID and a device name onto a session management server that manages sessions between the communication terminals, and (ii) a pair of the device ID and an address of the connecting communication terminal onto a trigger server that notifies the connected communication terminal of a request for a communication with the session management server, the device ID identifying the connecting communication terminal, and the device name indicating a name of the connecting communication terminal;
a transmission unit operable to transmit a request for a connection to the session management server, the request having device names of the connecting communication terminal and the connected communication terminal;
an address resolution unit operable to obtain an address of the connected communication terminal by receiving, from the session management server, at least the address of the connected communication terminal and a session ID that is unique to the communication with the connected communication terminal, after the transmission performed by said transmission unit; and
a Peer-to-Peer communication unit operable to establish a connection to the connected communication terminal, and to perform direct communication with the connected communication terminal in the case when the address of the connected communication terminal is received.

12. The connecting communication terminal according to claim 11,
wherein said address resolution unit is further operable to receive, from the session management server, the address of the connected communication terminal, the session ID, and a permitted duration during which the communication between the communication terminals is permitted, and
said Peer-to-Peer communication unit is operable to start a Peer-to-Peer communication with the connected communication terminal in the case when all of data communication is completed or where the permitted duration expires.

13. The connecting communication terminal according to claim 12,
   wherein said Peer-to-Peer communication unit is operable to transmit, to the session management server, a permitted-duration extension request for requesting an extension of the permitted duration, in the case of continuing the communication with the connected communication terminal after the permitted duration expires.

14. The connecting communication terminal according to claim 11,
   wherein said address resolution unit is operable to receive, from the session management server, the address of the connected communication terminal, the session ID, the encryption communication key, and a permitted duration during which the communication between the communication terminals is permitted, and
   said Peer-to-Peer communication unit is operable to perform encryption on data using the encryption communication key during the direct communication with the connected communication terminal.

15. The connecting communication terminal according to claim 11, further comprising
   an end notification unit operable to send a communication end notification to the session management server in the case when the communication with the connected communication terminal is terminated.

16. The connecting communication terminal according to claim 11,
   wherein said Peer-to-Peer communication unit is operable to terminate the communication with the connected communication terminal in the case when a communication end command is received from the trigger server.

17. The connecting communication terminal according to claim 11, further comprising
   a data transmission unit operable to regularly transmit address notification data to the trigger server, the address notification data being made up of (i) a header section that includes at least the address of the connecting communication terminal and an address of the trigger server, and (ii) a data section that includes at least the device ID of the connecting communication terminal.

18. A session management server that manages direct communication between a connecting communication terminal and a connected communication terminal, said session management server comprising:
   a storage unit operable to receive and store a pair of device ID and device name that is transmitted from the respective communication terminals, the device ID identifying each of the communication terminals, and the device name indicating a name of each communication terminal;
   a trigger transmission unit operable, upon receiving a connection request in which device names of the connecting communication terminal and the connected communication terminal are described, (i) to extract, based on the device name, a device ID of the connected communication terminal from said storage unit, and (ii) to transmit, to a trigger server, a trigger for requesting the connected communication terminal identified by the device ID to transmit a permission list, the trigger server notifying of the request made to the connected communication terminal, and the permission list being a list of device names of communication terminals to which communication is permitted;
   a name search unit operable to search for the device name of the connecting communication terminal in the permission list after receiving the permission list;
   an address inquiry unit operable to transmit, to the trigger server, an address inquiry for inquiring about addresses of the connecting communication terminal and the connected communication terminal based on the device IDs of the communication terminals, in the case when the device name of the connecting communication terminal is found in the permission list;
   a session generation unit operable to generate a session ID that is unique to the communication between the connecting communication terminal and the connected communication terminal; and
   a transmission unit operable to transmit (i) at least the session ID and the address of the connected communication terminal to the connecting communication terminal, and (ii) at least the session ID and the address of the connecting communication terminal to the connected communication terminal, in the case when said address inquiry unit receives, from the trigger server, the addresses of the communication terminals as a response to the address inquiry.

19. The session management server according to claim 18, further comprising
   a permission judgment request generation unit operable (i) to extract the device ID of the connected communication terminal from said storage unit, and (ii) to generate a permission judgment request, the permission judgment request being made for requesting the connected communication terminal identified by the device ID to judge whether or not to permit the direct communication with the connecting communication terminal,
   wherein said transmission unit is operable to transmit the permission judgment request to the trigger server.

20. The session management server according to claim 18,
   wherein said session generation unit is further operable to generate a permitted duration during which the communication between the communication terminals is permitted, and
   said transmission unit is operable to transmit (i) the session ID, the permitted duration, and the address of the connected communication terminal, to the connecting communication terminal, and (ii) the session ID, the permitted duration and the address of the connecting communication terminal, to the connected communication terminal, in the case when the addresses of the communication terminals are received from the trigger server as a response to the address inquiry.

21. The session management server according to claim 20,
   wherein said session generation unit is further operable to generate a new, extended permitted-duration, in the case when a permitted-duration extension request is received from the connecting communication terminal or the connected communication terminal, the permitted-duration extension request being made for requesting an extension of the permitted duration, and
   said transmission unit is operable to transmit the new permitted-duration to the connecting communication terminal and the connected communication terminal.

22. The session management server according to claim 20,
   wherein the permitted duration is one of the following: a time limit for direct communication; and a maximum amount of data permitted during direct communication.

23. The session management server according to claim 18,
   wherein said session generation unit is further operable to generate an encryption communication key to be used for the direct communication between the connecting communication terminal and the connected communication terminal, and said transmission unit is operable to transmit (i) the session ID, the permitted duration, the encryption communication key and the address of the connected communication terminal, to the connecting communication terminal, and (ii) the session ID, the permitted duration, the encryption communication key, and the address of the connecting communication terminal, to the connected communication terminal.

24. The session management server according to claim 18, further comprising
an end processing unit operable to (i) receive an end notification indicating that the direct communication is terminated, from the connecting communication terminal or the connected communication terminal, and (ii) to manage the direct communication.

25. The session management server according to claim 24, wherein said end processing unit is further operable to generate an end command for terminating the direct communication between the connecting communication terminal and the connected communication terminal, and
said transmission unit is operable to transmit the end command to the trigger server.

26. A trigger server that manages addresses of a connecting communication terminal and a connected communication terminal, and that notifies the connected communication terminal of a request, the trigger server comprising:
an address storage unit operable to receive and store a pair of device ID and address that is transmitted from the respective communication terminals, the device ID identifying each of the communication terminals;
a receiving unit operable to receive, from a session management server, a trigger for requesting a transmission of a permission list, the session management server managing sessions between the connecting communication terminal and the connected communication terminal, and the permission list being a list of device names of communication terminals to which communication is permitted;
a trigger processing unit operable to transmit, to the connected communication terminal, the request of transmitting the permission list to the session management server, in the case when the trigger requesting the transmission of the permission list is received by said receiving unit; and
a polling receiving unit operable to receive polling performed by the connected communication terminal, so as to transmit the request.

27. The trigger server according to claim 26, further comprising:
an address inquiry receiving unit operable to receive an address inquiry for inquiring about the addresses corresponding to the device IDs of the connecting communication terminal and the connected communication terminal; and
an address response unit operable (i) to extract the addresses identified by the device IDs of the communication terminals from among the pairs, each being made up of a device ID and an address and stored in said address storage unit, and (ii) to transmit the extracted addresses to the session management server.

28. The trigger server according to claim 26,
wherein said receiving unit is further operable to receive, from the session management server, a trigger for requesting a result of a search made in a permission list, the search being conducted for finding the device name of the connecting communication terminal, and the permission list being a list of device names of communication terminals to which communication is permitted, and
said trigger processing unit is operable to transmit the request for the search result in the case when the trigger is received.

29. The trigger server according to claim 26,
wherein the trigger server is further operable (i) to receive, from the session management server, an end command for terminating the communication between the connecting communication terminal and the connected communication terminal, and (ii) to transmit the end command to the respective communication terminals.

30. A program, which is embodied on a computer-readable medium, for a connected communication terminal that communicates with a connecting communication terminal that requests direct communication via a network, said program causing a computer to execute:
registering (i) a pair of a device ID and a device name onto a session management server that manages sessions between the communication terminals, and (ii) a pair of the device ID and an address of the connected communication terminal onto a trigger server that notifies the connected communication terminal of a request for a communication with the session management server, the device ID identifying the connected communication terminal, and the device name indicating a name of the connected communication terminal;
holding a permission list that is a list of device names of communication terminals to which direct communication is permitted;
performing polling on the trigger server so as to receive the request for the communication with the session management server from the trigger server;
receiving, from the session management server, at least an address of the connecting communication terminal and a session ID that is unique to the communication with the connecting communication terminal; and
performing direct communication with the connecting communication terminal in the case when the address of the connecting communication terminal and the session ID are received.

31. A program, which is embodied on a computer-readable medium, for a connecting communication terminal that performs direct communication with a connected communication terminal via a network, said program causing a computer to execute:
registering (i) a pair of a device ID and a device name onto a session management server that manages sessions between the communication terminals, and (ii) a pair of the device ID and an address of the connecting communication terminal onto a trigger server that notifies the connected communication terminal of a request for a communication with the session management server, the device ID identifying the connecting communication terminal, and the device name indicating a name of the connecting communication terminal;
transmitting a request for a connection to the session management server, the request having device names of the connecting communication terminal and the connected communication terminal;
obtaining an address of the connected communication terminal by receiving, from the session management server, at least the address of the connected communication terminal and a session ID that is unique to the communication with the connected communication terminal after said transmitting; and establishing a connection to the connected communication terminal, and performing direct communication with the connected communication terminal in the case when the address of the connected communication terminal is received.

32. A program, which is embodied on a computer-readable medium, for a session management server that manages direct communication between a connecting communication terminal and a connected communication terminal, said program causing a computer to execute:
receiving and storing a pair of device ID and device name that is transmitted from the respective communication terminals, the device ID identifying each of the communication terminals, and the device name indicating a name of each communication terminal;
upon receiving a connection request in which device names of the connecting communication terminal and the connected communication terminal are described, (i) extracting, based on the device name, a device ID of the connected communication terminal from the stored pairs, and (ii) transmitting, to a trigger server, a trigger for requesting the connected communication terminal identified by the device ID to transmit a permission list, the trigger server notifying of the request made to the connected communication terminal, and the permission list being a list of device names of communication terminals to which communication is permitted;
searching for the device name of the connecting communication terminal in the permission list after receiving the permission list;
transmitting, to the trigger server, an address inquiry for inquiring about addresses of the connecting communication terminal and the connected communication terminal based on the device IDs of the communication terminals, in the case when the device name of the connecting communication terminal is found in the permission list;
generating a session ID that is unique to the communication between the connecting communication terminal and the connected communication terminal; and
transmitting (i) at least the session ID and the address of the connected communication terminal to the connecting communication terminal, and (ii) at least the session ID and the address of the connecting communication terminal to the connected communication terminal, in the case when the addresses of the communication terminals are received from the trigger server as a response to the address inquiry.

33. A program, which is embodied on a computer-readable medium, for a trigger server that manages addresses of a connecting communication terminal and a connected communication terminal, and that notifies the connected communication terminal of a request, said program causing a computer to execute:
receiving and storing a pair of device ID and address that is transmitted from the respective communication terminals, the device ID identifying each of the communication terminals;
receiving, from a session management server, a trigger for requesting a transmission of a permission list, the session management server managing sessions between the connecting communication terminal and the connected communication terminal, and the permission list being a list of device names of communication terminals to which communication is permitted;
transmitting, to the connected communication terminal, the request of transmitting the permission list to the session management server, in the case when the trigger requesting the transmission of the permission list is received in said receiving; and
receiving polling performed by the connected communication terminal, so as to transmit the request.

34. A communication method for a connected communication terminal that communicates with a connecting communication terminal that requests direct communication via a network, said method comprising:
registering (i) a pair of a device ID and a device name onto a session management server that manages sessions between the communication terminals, and (ii) a pair of the device ID and an address of the connected communication terminal onto a trigger server that notifies the connected communication terminal of a request for a communication with the session management server, the device ID identifying the connected communication terminal, and the device name indicating a name of the connected communication terminal;
holding a permission list that is a list of device names of communication terminals to which direct communication is permitted;
performing polling on the trigger server so as to receive the request for the communication with the session management server from the trigger server;
receiving, from the session management server, at least an address of the connecting communication terminal and a session ID that is unique to the communication with the connecting communication terminal; and
performing direct communication with the connecting communication terminal in the case when the address of the connecting communication terminal and the session ID are received.

35. A communication method for a connecting communication terminal that performs direct communication with a connected communication terminal via a network, said method comprising:
registering (i) a pair of a device ID and a device name onto a session management server that manages sessions between the communication terminals, and (ii) a pair of the device ID and an address of the connecting communication terminal onto a trigger server that notifies the connected communication terminal of a request for a communication with the session management server, the device ID identifying the connecting communication terminal, and the device name indicating a name of the connecting communication terminal;
transmitting a request for a connection to the session management server, the request having device names of the connecting communication terminal and the connected communication terminal;
obtaining an address of the connected communication terminal by receiving, from the session management server, at least the address of the connected communication terminal and a session ID that is unique to the communication with the connected communication terminal, after the transmission performed in said transmitting; and
establishing a connection to the connected communication terminal, and performing direct communication with the connected communication terminal in the case when the address of the connected communication terminal is received.

36. A communication method for a session management server that manages direct communication between a connecting communication terminal and a connected communication terminal, said method comprising:

receiving and storing a pair of device ID and device name that is received from the respective communication terminals, the device ID identifying each of the communication terminals, and the device name indicating a name of each communication terminal;

upon receiving a connection request in which device names of the connecting communication terminal and the connected communication terminal are described, (i) extracting, based on the device name, a device ID of the connected communication terminal from the stored pairs, and (ii) transmitting, to a trigger server, a trigger for requesting the connected communication terminal identified by the device ID to transmit a permission list, the trigger server notifying of the request made to the connected communication terminal, and the permission list being a list of device names of communication terminals to which communication is permitted;

searching for the device name of the connecting communication terminal in the permission list after receiving the permission list;

transmitting, to the trigger server, an address inquiry for inquiring about addresses of the connecting communication terminal and the connected communication terminal based on the device IDs of the communication terminals, in the case when the device name of the connecting communication terminal is found in the permission list;

generating a session ID that is unique to the communication between the connecting communication terminal and the connected communication terminal; and transmitting (i) at least the session ID and the address of the connected communication terminal to the connecting communication terminal, and (ii) at least the session ID and the address of the connecting communication terminal to the connected communication terminal, in the case when the addresses of the communication terminals are received from the trigger server as a response to the address inquiry.

37. A communication method for a trigger server that manages addresses of a connecting communication terminal and a connected communication terminal, and that notifies the connected communication terminal of a request, said method comprising:

receiving and storing a pair of device ID and address that is transmitted from the respective communication terminals, the device ID identifying each of the communication terminals;

receiving, from a session management server, a trigger for requesting a transmission of a permission list, the session management server managing sessions between the connecting communication terminal and the connected communication terminal, and the permission list being a list of device names of communication terminals to which communication is permitted;

transmitting, to the connected communication terminal, the request of transmitting the permission list to the session management server, in the case when the trigger requesting the transmission of the permission list is received in said receiving; and receiving polling performed by the connected communication terminal, so as to transmit the request.

38. A communication system comprising: a connecting communication terminal, a connected communication terminal, a session management server that manages sessions between said communication terminals, and a trigger server that notifies the connected communication terminal of a request made by said session management server, wherein said connected communication terminal includes:
a registration unit operable to register (i) a pair of a device ID and a device name onto the session management server that manages sessions between the communication terminals, and (ii) a pair of the device ID and an address of the connected communication terminal onto the trigger server that notifies the connected communication terminal of a request for a communication with the session management server, the device ID identifying the connected communication terminal, and the device name indicating a name of the connected communication terminal;

a holding unit operable to hold a permission list that is a list of device names of communication terminals to which direct communication is permitted;

a polling unit operable to perform polling on the trigger server so as to receive the request for the communication with the session management server from the trigger server;

an address resolution unit operable to receive, from the session management server, at least an address of the connecting communication terminal and a session ID that is unique to the communication with the connecting communication terminal; and a Peer-to-Peer communication unit operable to establish a connection to the connecting communication terminal, and to perform direct communication with the connecting communication terminal in the case when the address of the connecting communication terminal and the session ID are received, said connecting communication terminal includes:
a registration unit operable to register (i) a pair of a device ID and a device name onto the session management server that manages sessions between the communication terminals, and (ii) a pair of the device ID and the address of the connecting communication terminal onto the trigger server that notifies the connected communication terminal of the request for a communication with the session management server, the device ID identifying the connecting communication terminal, and the device name indicating a name of the connecting communication terminal;

a transmission unit operable to transmit a request for a connection to the session management server, the request having device names of the connecting communication terminal and the connected communication terminal;

an address resolution unit operable to obtain the address of the connected communication terminal by receiving, from the session management server, at least the address of the connected communication terminal and the session ID that is unique to the communication with the connected communication terminal, after the transmission performed by said transmission unit; and a Peer-to-Peer communication unit operable to perform direct communication with the connected communication terminal in the case when the address of the connected communication terminal is received, said session management server includes:
a storage unit operable to receive and store a pair of device ID and device name that is received from the respective communication terminals, the device ID identifying each of the communication terminals, and the device name indicating a name of each communication terminal;

a trigger transmission unit operable, upon receiving a connection request in which device names of the connecting communication terminal and the connected communication terminal are described, (i) to extract, based on the device name, a device ID of the connected communication terminal from said storage unit, and (ii) to transmit, to the trigger server, a trigger for requesting the connected communication terminal identified by the device ID to transmit the permission list, the trigger server notifying of the request made to the connected communication terminal, and the permission list being a list of device names of communication terminals to which communication is permitted;

a name search unit operable to search for the device name of the connecting communication terminal in the permission list after receiving the permission list;

an address inquiry unit operable to transmit, to the trigger server, an address inquiry for inquiring about addresses of the connecting communication terminal and the connected communication terminal based on the device IDs of the communication terminals, in the case when the device name of the connecting communication terminal is found in the permission list;

a session generation unit operable to generate the session ID that is unique to the communication between the connecting communication terminal and the connected communication terminal; and a transmission unit operable to transmit (i) at least the session ID and the address of the connected communication terminal to the connecting communication terminal, and (ii) at least the session ID and the address of the connecting communication terminal to the connected communication terminal, in the case when said address inquiry unit receives, from the trigger server, the addresses of the communication terminals as a response to the address inquiry, and said trigger server includes:

an address storage unit operable to receive and store a pair of device ID and address that is transmitted from the respective communication terminals, the device ID identifying each of the communication terminals;

a receiving unit operable to receive, from the session management server, the trigger for requesting the transmission of the permission list, the session management server managing sessions between the connecting communication terminal and the connected communication terminal, and the permission list being a list of device names of communication terminals to which communication is permitted;

a trigger processing unit operable to transmit, to the connected communication terminal, the request of transmitting the permission list to the session management server, in the case when the trigger requesting the transmission of the permission list is received by said receiving unit; and a polling receiving unit operable to receive polling performed by the connected communication terminal, so as to transmit the request.

39. The connected communication terminal according to claim 2,
wherein the permission list includes device names of communication terminals to which direct communication is refused.

40. The connected communication terminal according to claim 3,
wherein the permission list includes device names of communication terminals to which direct communication is refused.

41. The session management server according to claim 21,
wherein the permitted duration is one of the following: a time limit for direct communication; and a maximum amount of data permitted during direct communication.

* * * * *